(12) United States Patent
Logan et al.

(10) Patent No.: US 9,971,840 B2
(45) Date of Patent: May 15, 2018

(54) SYSTEMS AND METHODS FOR DISCOVERING AND MONITORING DEVICES USING SEARCH PATTERNS FOR OBJECT IDENTIFIERS AND VALUES

(71) Applicant: ConnectWise Inc., Tampa, FL (US)

(72) Inventors: Scott Logan, Stoneham, MA (US); Kevin Davis, Apollo Beach, FL (US)

(73) Assignee: Connectwise, Inc., Tampa, FL (US)

( * ) Notice: Subject to any disclaimer, the term of this patent is extended or adjusted under 35 U.S.C. 154(b) by 409 days.

(21) Appl. No.: 14/704,606

(22) Filed: May 5, 2015

(65) Prior Publication Data

US 2015/0324465 A1     Nov. 12, 2015

Related U.S. Application Data

(60) Provisional application No. 61/989,548, filed on May 7, 2014.

(51) Int. Cl.
*G06F 17/30* (2006.01)
*H04L 12/24* (2006.01)
*H04L 12/26* (2006.01)

(52) U.S. Cl.
CPC .. *G06F 17/30876* (2013.01); *G06F 17/30327* (2013.01); *G06F 17/30864* (2013.01); *H04L 41/0213* (2013.01); *H04L 41/0853* (2013.01); *H04L 43/0817* (2013.01); *H04L 41/0843* (2013.01); *H04L 41/0846* (2013.01)

(58) Field of Classification Search
CPC . H04L 41/0213; H04L 41/0843; H04L 43/18; G06F 17/30362; G06F 17/30171

USPC ................. 709/223, 230; 707/704
See application file for complete search history.

(56) References Cited

U.S. PATENT DOCUMENTS

| 6,081,838 | A | * | 6/2000 | Yoshihara | ........... | H04L 41/0206 |
| | | | | | | 707/999.002 |
| 6,108,782 | A | | 8/2000 | Fletcher et al. | | |
| 6,954,786 | B1 | | 10/2005 | Vered et al. | | |
| 7,574,431 | B2 | | 8/2009 | Young | | |

(Continued)

OTHER PUBLICATIONS

Alloy Software, "Alloy Discovery 6", product datasheet, Apr. 16, 2013, Nutley, New Jersey.

(Continued)

*Primary Examiner* — Dennis Truong
(74) *Attorney, Agent, or Firm* — Foley & Lardner LLP

(57) ABSTRACT

The present disclosure is directed to systems and methods of managing remote devices. The system can include a server with memory, a detection module, and a collection module. The memory can store a management information base (MIB) having a hierarchical tree of object identifiers and corresponding object values. The detection module can query devices and receive a first object identifier and its first object value, which can vary from those in the MIB; and use patterns to match the first object identifier and object value; and generate an identification of the device from the matches. The collection module can use the identification to select a collection template, which can indicate a subtree of the MIB and a collection pattern; traverse the subtree and identify a second object identifier that matches the collection pattern, and its second object value; and associate the second object value with the first object value.

20 Claims, 15 Drawing Sheets

(56) References Cited

U.S. PATENT DOCUMENTS

| | | | |
|---|---|---|---|
| 7,668,944 | B2 | 2/2010 | Leib et al. |
| 7,860,960 | B1 | 12/2010 | Knight et al. |
| 7,886,033 | B2 | 2/2011 | Hopmann et al. |
| 8,849,973 | B2 | 9/2014 | Leib et al. |
| 2004/0255014 | A1* | 12/2004 | Motoyama ......... H04L 43/0811 709/223 |
| 2007/0101193 | A1* | 5/2007 | Johnson ................... G06F 1/26 714/25 |
| 2009/0132719 | A1* | 5/2009 | Havard ............... H04L 41/0213 709/230 |
| 2010/0094981 | A1* | 4/2010 | Cordray ................ G06F 15/173 709/222 |
| 2013/0036108 | A1 | 2/2013 | Corbeau |
| 2013/0138958 | A1* | 5/2013 | Mandell ............. H04L 41/0213 713/168 |
| 2013/0311238 | A1* | 11/2013 | Cheloff ............. G06Q 30/0206 705/7.35 |
| 2014/0160942 | A1* | 6/2014 | Mandavilli ......... H04L 41/0645 370/242 |
| 2015/0089055 | A1 | 3/2015 | Sullivan |

OTHER PUBLICATIONS

Alloy Software, "Alloy Navigator 6", product overview, Jun. 25, 2010, Nutley, New Jersey.
Barry, Ian, Tony Roman, Larry Adams, J. P. Pasnak, Jimmy Conner, Reinhard Scheck, and Andreas Braun, "The Cacti Manual", section III.12, SNMP Query XML Syntax, 2013, retrieved from cacti.net web site on Mar. 31, 2015.
Bass, Elijah W., Bilgehan Erman, David P. Mongeau, Mengqi Wu, and Chen Xie. "Rapid software development for multi-vendor services." Bell Labs Technical Journal 9, No. 4, 2005, Alcatel-Lucent, Boulogne-Billancourt, France.
Cisco Systems, Inc., "Topology Discovery Methods", User Guide for CiscoWorks Network Connectivity Monitor, chapter 9, document 78-15279-01, Aug. 4, 2007, San Jose, California.
Cisco Systems, Inc., "Understanding Discovery Results", User Guide for CiscoWorks Network Connectivity Monitor, chapter 10, document 78-15279-01, Aug. 4, 2007, San Jose, California.
Curry, Jane, "Zenoss Discovery and Classification", Skills 1st Ltd., Jun. 22, 2009, Maidenhead, United Kingdom.
Gavalas, Damianos, Dominic Greenwood, Mohammed Ghanbari, and Mike O'Mahony, "Advanced network monitoring applications based on mobile/intelligent agent technology", Computer Communications 23, No. 8, Apr. 1, 2000, Elsevier, Amsterdam, Netherlands.
Goldszmidt, German, "Network Management Views using Delegated Agents", Proceedings of the 6th CAS Conference, Nov. 1996, Toronto, Canada.
Ipswitch, Inc., "WhatsUp Gold Distributed edition", data sheet, document WUG_C104-P775, Apr. 16, 2008, Lexington, Massachusetts.
Ipswitch, Inc., "WhatsUp Gold Premium", data sheet, document WUG_C104-P774, Apr. 16, 2008, Lexington, Massachusetts.
Ipswitch, Inc., "WhatsUp Gold WhatsConnected User Guide", version 3.0, Feb. 9, 2011, Lexington, Massachusetts.
Jakubcik, Ondeej, "Sun servers open—source software systems management", bachelor's thesis, Czech Technical University in Prague, Faculty of Electrical Engineering, May 27, 2010, Prague, Czech Republic.
Kaseya, "Discovery", Kaseya 2 User Guide, Version 6.5 and 1.0, Jan. 23, 2014, Waltham, Massachusetts.
Kaseya, "Kaseya Discovery & Inventory", product brief, Feb. 10, 2010, Waltham, Massachusetts.
Level Platforms Inc., "Managed Workplace 2012", release notes, Mar. 19, 2012, Level Platforms, Ottawa, Ontario, Canada.
Level Platforms Inc., "Managed Workplace Setup Guide—On Premise", user manual, Jul. 3, 2012, Level Platforms, Ottawa, Ontario, Canada.
Maestas, Joseph H., "Network Configuration Management: Paving the Way to Network Agility", Sandia Report SAND2007-4475, Sandia National Laboratories, Aug. 2007, Albuquerque, New Mexico.
N-Able Technologies, Inc., a division of SolarWinds, "N-Central—An Introduction to SNMP", Oct. 18, 2012, Ottawa, Ontario, Canada.
N-Able Technologies, Inc., a division of SolarWinds, "N-Central Getting Started", version 9.1, Oct. 18, 2012, Ottawa, Ontario, Canada.
Networkview Software, pages from help file, extracted from downloaded/installed software from networkview.com web site Apr. 24, 2014, Apr. 30, 2011, Epalinges, Switzerland.
Pasnak, J. P., "Data Query Templates", Cacti documentation and howtos, updated Jun. 10, 2010, retreived from cacti.net web site on Mar. 31, 2015.
Porter, Lee, "Agentx and multiple copies of same mibs—distributed control plane", net-snmp mailing list, Mar. 21, 2006, downloaded from opensubscriber.com web site Apr. 12, 2015.
Rochon, Peter, "What's new in version 5", Level Platforms Managed Workplace 5.0 release notes, Oct. 21, 2012, Level Platforms, Ottawa, Ontario, Canada.
Solarwinds Inc., "Network Topology Mapper", datasheet, Nov. 27, 2013, Austin, Texas.
Solarwinds Worldwide, LLC, "Discover & Map Your Network Using SolarWinds® Network Topology Mapper (NTM)", tech tip, Nov. 18, 2013, Austin, Texas.
Story, Robert, "rstory's NET-SNMP Developers Frequently Asked Questions Page", Apr. 19, 2006, downloaded from freesnmp.com web site Apr. 12, 2015.
The OpenNMS Group, Inc., "OpenNMS Provisioning", user manual, version 1.8.0, Jan. 21, 2010, Pittsboro, North Carolina.
Vincente, Carlos, et al., "The Network Documentation Tool—Netdot", University of Oregon, Dec. 12, 2013, Eugene, Oregon.
Zoho Corp., "WebNMS Framework 5 Deployment Guide", version 5.0, May 5, 2011, Pleasanton, California.
Zoho Corp., "WebNMS Framework 5 User Guide", version 5.2, Oct. 22, 2013, Pleasanton, California.
Zoho Corporation, "Add Credentials", *OpManager online help topic*, downloaded from help.opmanager.com site Apr. 17, 2014, Pleasanton, California.
Zoho Corporation, "Discover Individual Devices", *OpManager online help topic*, downloaded from help.opmanager.com site Apr. 17, 2014, Pleasanton, California.
Zoho Corporation, "Discovering Networks Using OpManager", *OpManager online help topic*, downloaded from help.opmanager.com site Apr. 17, 2014, Pleasanton, California.
Zoho Corporation, "Layer 2 Mapping", *OpManager online help topic*, downloaded from help.opmanager.com site Apr. 17, 2014, Pleasanton, California.
Zoho Corporation, "Rule Engine", *OpManager online help topic*, downloaded from help.opmanager.com site Apr. 16, 2014, Pleasanton, California.
Zoho Corporation, *demonstration pages for TopoMapper Plus product*, downloaded from demo.topomapperplus.com site Apr. 16, 2014, Pleasanton, California.
Zoho Corporation, "*ManageEngine OpManager User Guide*", Jan. 17, 2014, Pleasanton, California.
Ipswitch, Inc., "WhatsUp Gold User Guide", version 16.1, Mar. 11, 2013, Lexington, Massachusetts.

* cited by examiner

401a → SNMP message:
401b → 30     type = sequence
401c → 29     length = 41
402a → SNMP version:
402b → 02     type = integer
402c → 01     length = 1
402d → 01     value = 1
403a → Community string:
403b → 04     type = octet string
403c → 06     length = 6
403d → 70 75 62 6c 69 63     value = "public"
404a → Protocol Data Unit:
404b → a0     type = GetRequest PDU
404c → 1c     length = 28
405a → Request ID:
405b → 02     type = integer
405c → 04     length = 4
405d → 4c b0 d9 d6
405e → Error:
405f → 02     type = integer
405g → 01     length = 1
405h → 00
405i → Error index:
405j → 02     type = integer
405k → 01     length = 1
405l → 00
405m → Varbind list:
405n → 30     type = sequence
405o → 0e     length = 14
406a → Variable #1:
406b → 30     type = sequence
406c → 0c     length = 12
407a → Object ID:
407b → 06     type = OID
407c → 08     length = 8
407d → 2b 06 01 02 01 01 05 00     value = 1.3.6.1.2.1.1.5.0
407e → Value:
407f → 05     type = NULL
407g → 00     length = 0

FIG. 4A

411a → SNMP message:
411b → 30      type = sequence
411c → 36      length = 54
412a ────→ SNMP version:
412b ────→ 02      type = integer
412c ────→ 01      length = 1
412d ────→ 01      value = 1
413a ────→ Community string:
413b ────→ 04      type = octet string
413c ────→ 06      length = 6
413d ────→ 70 75 62 6c 69 63      value = "public"
414a ────→ Protocol Data Unit:
414b ────→ a2      type = GetResponse PDU
414c ────→ 29      length = 41
415a ─────→ Request ID:
415b ─────→ 02      type = integer
415c ─────→ 04      length = 4
415d ─────→ 4c b0 d9 d6
415e ─────→ Error:
415f ─────→ 02      type = integer
415g ─────→ 01      length = 1
415h ─────→ 00
415i ─────→ Error index:
415j ─────→ 02      type = integer
415k ─────→ 01      length = 1
415l ─────→ 00
415m ─────→ Varbind list:
415n ─────→ 30      type = sequence
415o ─────→ 1b      length = 27
416a ──────→ Variable #1:
416b ──────→ 30      type = sequence
416c ──────→ 19      length = 25
417a ───────→ Object ID:
417b ───────→ 06      type = OID
417c ───────→ 08      length = 8
417d ───────→ 2b 06 01 02 01 01 05 00      value = 1.3.6.1.2.1.1.5.0
417e ───────→ Value:
417f ───────→ 04      type = octet string
417g ───────→ 0d      length = 13
417h ───────→ 74 61 69 70 65 69 2d 62 61 63 6b 75 70
                                                        value = "taipei-backup"

FIG. 4B

421 → Simple Network Management Protocol
422a → version: v2c (1)
422b → community: public
422c → data: getBulkRequest (5)
423 → getBulkRequest
424a → request-id: 1359515446
424b → non-repeaters: 0
424c → max-repetitions: 10
424d → variable-bindings: 1 item
425 → 1.3.6.1.2.1.1: Value (Null)
426 → Object Name: 1.3.6.1.2.1.1
427 → Value (Null)

FIG. 4C

431 → Simple Network Management Protocol
432a ────→ version: v2c (1)
432b ────→ community: public
432c ────→ data: get-response (2)
433 ──────→ get-response
434a ──────────→ request-id: 1359515446
434b ──────────→ error-status: noError (0)
434c ──────────→ error-index: 0
434d ──────────→ variable-bindings: 10 items
435a ──────────────→ 1.3.6.1.2.1.1.1.0: "Hardware: AMD64 - Software: Windows 6.3"
436a ──────────────→ Object Name: 1.3.6.1.2.1.1.1.0
437a ──────────────→ Value (OctetString): "Hardware: AMD64 - Software: Windows 6.3"
435b ──────────────→ 1.3.6.1.2.1.1.2.0: 1.3.6.1.4.1.311.1.1.3.1.1
436b ──────────────→ Object Name: 1.3.6.1.2.1.1.2.0
437b ──────────────→ Value (OID): 1.3.6.1.4.1.311.1.1.3.1.1
435c ──────────────→ 1.3.6.1.2.1.1.3.0: 736120
436c ──────────────→ Object Name: 1.3.6.1.2.1.1.3.0
437c ──────────────→ Value (Timeticks): 736120
435d ──────────────→ 1.3.6.1.2.1.1.4.0: "John Doe"
436d ──────────────→ Object Name: 1.3.6.1.2.1.1.4.0
437d ──────────────→ Value (OctetString): "John Doe"
435e ──────────────→ 1.3.6.1.2.1.1.5.0: "test-system"
436e ──────────────→ Object Name: 1.3.6.1.2.1.1.5.0
437e ──────────────→ Value (OctetString): "test-system"
435f ──────────────→ 1.3.6.1.2.1.1.6.0: "Front desk"
436f ──────────────→ Object Name: 1.3.6.1.2.1.1.6.0
437f ──────────────→ Value (OctetString): "Front desk"
435g ──────────────→ 1.3.6.1.2.1.1.7.0: 79
436g ──────────────→ Object Name: 1.3.6.1.2.1.1.7.0
437g ──────────────→ Value (Integer32): 79
435h ──────────────→ 1.3.6.1.2.1.2.1.0: 20
436h ──────────────→ Object Name: 1.3.6.1.2.1.2.1.0
437h ──────────────→ Value (Integer32): 20
435i ──────────────→ 1.3.6.1.2.1.2.2.1.1.1: 1
436i ──────────────→ Object Name: 1.3.6.1.2.1.2.2.1.1.1
437i ──────────────→ Value (Integer32): 1
435j ──────────────→ 1.3.6.1.2.1.2.2.1.1.2: 2
436j ──────────────→ Object Name: 1.3.6.1.2.1.2.2.1.1.2
437j ──────────────→ Value (Integer32): 2

FIG. 4D

461 → Simple Network Management Protocol
462a → version: v2c (1)
462b → community: public
462c → data: get-request (0)
463 → get-request
464a → request-id: 698121678
464b → error-status: noError (0)
464c → error-index: 0
464d → variable-bindings: 1 item
465 → 1.3.6.1.2.1.2.2.1.2.1: Value (Null)
466 → Object Name: 1.3.6.1.2.1.2.2.1.2.1
467 → Value (Null)

FIG. 4E

471 → Simple Network Management Protocol
472a → version: v2c (1)
472b → community: public
472c → data: get-response (2)
473 → get-response
474a → request-id: 698121678
474b → error-status: noError (0)
474c → error-index: 0
474d → variable-bindings: 1 item
475 → 1.3.6.1.2.1.2.2.1.2.1: "Software Loopback Interface 1"
476 → Object Name: 1.3.6.1.2.1.2.2.1.2.1
477 → Value (OctetString): "Software Loopback Interface 1"

FIG. 4F

481 → Simple Network Management Protocol
482a → version: v2c (1)
482b → community: public
482c → data: getBulkRequest (5)
483 → getBulkRequest
484a → request-id: 1254587219
484b → non-repeaters: 0
484c → max-repetitions: 4
484d → variable-bindings: 1 item
485 → 1.3.6.1.2.1.2.2.1.2: Value (Null)
486 → Object Name: 1.3.6.1.2.1.2.2.1.2
487 → Value (Null)

FIG. 4G

Simple Network Management Protocol ← 491
492a → version: v2c (1)
492b → community: public
492c → data: get-response (2)
493 → get-response
494a → request-id: 1254587219
494b → error-status: noError (0)
494c → error-index: 0
494d → variable-bindings: 4 items
495a → 1.3.6.1.2.1.2.2.1.2.1: "Software Loopback Interface 1"
496a → Object Name: 1.3.6.1.2.1.2.2.1.2.1
497a → Value (OctetString): "Software Loopback Interface 1"
495b → 1.3.6.1.2.1.2.2.1.2.2: "Microsoft Kernel Debug Network Adapter"
496b → Object Name: 1.3.6.1.2.1.2.2.1.2.2
497b → Value (OctetString): "Microsoft Kernel Debug Network Adapter"
495c → 1.3.6.1.2.1.2.2.1.2.3: "Realtek PCIe GBE Family Controller"
496c → Object Name: 1.3.6.1.2.1.2.2.1.2.3
497c → Value (OctetString): "Realtek PCIe GBE Family Controller"
495d → 1.3.6.1.2.1.2.2.1.2.4: "Qualcomm AR9485 Wireless Network Adapter"
496d → Object Name: 1.3.6.1.2.1.2.2.1.2.4
497d → Value (OctetString): "Qualcomm AR9485 Wireless Network Adapter"

FIG. 4H

501 → Discovery Rule

| | | |
|---|---|---|
| 502 → Rule name: | HP printer | 504 |
| 503 → Rule type: | Regular expression | ↓ |
| 505 → OID: | ^1\.3\.6\.1\.2\.1\.[1\|43]$ | |
| 506 → Pattern: | ^HP .*[Jj]et | |

507 → OK          Cancel ← 508

FIG. 5

601 ──► interfaces   1.3.6.1.2.1.2
602a ─────► ifNumber   1.3.6.1.2.1.2.1
602b ─────► ifTable    1.3.6.1.2.1.2.2
603 ──────────► ifEntry    1.3.6.1.2.1.2.2.1
604a ──────────────► ifIndex   1.3.6.1.2.1.2.2.1.1
604b ──────────────► ifDescr   1.3.6.1.2.1.2.2.1.2
604c ──────────────► ifType    1.3.6.1.2.1.2.2.1.3
604d ──────────────► ifMtu     1.3.6.1.2.1.2.2.1.4
604e ──────────────► ifSpeed   1.3.6.1.2.1.2.2.1.5
605 ──────────────►   . . .

FIG. 6A

Collection Rule ← 611

| | |
|---|---|
| 612a → Rule name: | Interface description and speed |
| 612b → Rule type: | Custom Table Walk |
| 612c → Collection interval: | 10 minutes |
| 612d → Historical interval: | <No Historical Collection> |
| 612e → Rule: | ^1\.3\.6\.1\.2\.1\.2\.2\.1\.(?<Desc>2)\|(?<Spd>5)\.(?<Idx>[0-9]*)$ |

613 ──► OK    614 ──► Cancel

FIG. 6B

| | 621a | 621b | 621c | 621d |
|---|---|---|---|---|
| 622 → | DevID | Idx | Desc | Spd |
| 623a → | 2 | 1 | Software Loopback Interface 1 | 1073741824 |
| 623b → | 2 | 2 | Microsoft Kernel Debug Network Adapter | 0 |
| 623c → | 2 | 3 | Realtek PCIe GBE Family Controller | 0 |
| 623d → | 2 | 4 | Qualcomm AR9485 Wireless Network Adapter | 108300000 |

FIG. 6C

701 → Collection Group
702a → Group name:
702b → Database table:
703 → Rule list:

| Use | Name | Type | Interval |
|---|---|---|---|
| ☑ | Interface description and speed | Custom Walk | 10 minutes |
| ☑ | Interface network information | Custom Walk | 10 minutes |
| ☐ | Interface extended information | Custom Walk | 60 minutes |
| ☑ | Interface vendor type | Retrieve OID | 60 minutes |

704 → Use column
705a → Interface description and speed
705b → Interface network information
705c → Interface extended information
705d → Interface vendor type 706a, 706b [OK] 706c [Cancel] 706d [Add]

SYSTEMS AND METHODS FOR DISCOVERING AND MONITORING DEVICES USING SEARCH PATTERNS FOR OBJECT IDENTIFIERS AND VALUES

CROSS-REFERENCE TO RELATED PATENT APPLICATIONS

This application claims the benefit of priority under 35 U.S.C. § 119 to U.S. Provisional Patent Application No. 61/989,548, titled "SYSTEMS AND METHODS FOR DISCOVERING AND MONITORING DEVICES USING SEARCH PATTERNS FOR OBJECT IDENTIFIERS AND VALUES," and filed on May 7, 2014, the entirety of which is hereby incorporated by reference.

FIELD OF THE DISCLOSURE

The present disclosure generally relates to discovering and monitoring devices in a network. More specifically, the present disclosure relates to using search patterns for object identifiers and values in order to facilitate the discovery and monitoring of devices in a network.

BACKGROUND OF THE DISCLOSURE

Devices may be discovered on a network, and information from such devices can be collected. The information can include, for example, device characteristics and settings. Further, device settings can be updated via the network. A protocol may use objects to represent information, and may use object identifiers to identify objects.

SUMMARY OF THE DISCLOSURE

Due to the size and complexity of a network, it may be challenging to manage devices on the network without Remote Monitoring and Management (RMM) software tools to help monitor and manage the devices. A task for such management may be to discover which devices are in a network. This discovery may be an initial operation for managing a new network, in order to know what devices are to be managed, or it may be an ongoing operation for managing an existing network, in order to know what has changed.

Device discovery, monitoring, and management can be facilitated by the use of a standard protocol that is adopted by many device vendors, since RMM software can then be used to manage a variety of devices. Examples of protocols for device discovery, monitoring, and management can include Simple Network Management Protocol (SNMP), Simple Service Discovery Protocol (SSDP), CISCO Discovery Protocol (CDP), and Link Layer Discovery Protocol (LLDP).

Management protocols may use objects to represent a device, and to represent device features and device settings for both reading and writing. Objects can be described by an object identifier (OID) and an object value. For example, SNMP uses OIDs with a hierarchical naming scheme that is defined by the Internet Assigned Numbers Authority (IANA). The IANA OID definitions include a standard set that can be used by multiple vendors, and the definitions also allow for vendors to define their own OIDs that are specific to the vendors' devices.

Vendors may want to create definitions of the objects used by their devices in a standard format, so that RMM software can easily and automatically discover, monitor, and manage those devices. For example, a collection of SNMP objects can be assembled into a Management Information Base (MIB), which may have a standardized format. A vendor can create MIBs for some or all of the devices sold by the vendor, and distribute those MIBs online as well as storing the MIBs in MIB collections. These MIBs can facilitate the automation of discovery, monitoring, and management of the vendor's products by RMM software.

One disadvantage of using MIBs, or other collections of objects, can be that the structure of OIDs in the MIBs may be very rigid. This rigid structure may indicate duplication of large amounts of the MIB for multiple similar products. This rigid structure may also indicate "near-duplication", where large parts of the MIBs for similar products are the same with small variations. This duplication and near-duplication can cause problems when the MIB must be updated, because a change in the duplicated data may indicate a change to be correctly propagated to some or all copies.

A vendor may update products by adding new features and settings to the products, which may indicate updating the MIBs for those products. The vendor may want to continue to sell or support multiple versions of the same product, and may want to continue to maintain and update the MIBs for some or all of these products. Tracking changes in the products with corresponding changes in the MIBs may represent a significant version control challenge.

Another challenge for vendors may be verifying that MIBs are free of errors. Testing some or all of the MIBs may indicate an extensive test suite that exercises some or all of the features and settings of some or all devices and verifies that some or all of the settings can be monitored and updated correctly. This testing can be extensive and costly, and a vendor may decide to eliminate or substantially reduce the testing.

Still another challenge for vendors can be maintaining and updating the implementation of the functions described by the MIBs in the devices. Since these functions may not be used in ordinary operation of the device, and may only be used by device management, errors in the implementation of the functions may not show up in ordinary use of the device. For example, a device could have an error where the device name is misspelled in the value of an object, and the error might not be discovered until the device is already in production.

Because of these considerations and others, MIBs may include errors that may prevent the MIBs from being used by RMM software that assumes the MIBs are free of errors. In addition, it may be difficult to keep up with new MIBs or updated MIBs released by vendors. As a result, it can be desirable to have a system that can tolerate imperfections in MIBs and can use existing MIBs for new products that are released with small variations that may not affect the utility of the existing MIBs for managing and monitoring the new devices.

Systems and methods of the present disclosure describe a system that can tolerate imperfections in MIBs and can use existing MIBs for new products. Instead of requiring OIDs to conform to a rigid naming scheme, patterns may be used to describe OIDs. These patterns may apply to either the numerical representation of the OIDs or their symbolic representation. Patterns may also be used to retrieve and recognize the object values addressed by OIDs. In this way, RMM software can be tolerant of errors in MIBs and their implementation in devices, and may be able to properly monitor and manage a device even if the specific MIB for that device is not available.

RMM software may use additional information that is not included in the MIB. For example, the RMM software may define database locations for storing values retrieved from objects in the MIB. Systems and methods of the present disclosure can facilitate reducing the number of definitions of additional information that is not included in the MIB, by applying one definition to a group of devices and MIBs defined by a pattern. This reduction in the number of definitions can then facilitate the management of the definitions by reducing the amount of work and duplication involved.

Although some of the examples of advantages given have used SNMP as a protocol, it will be apparent to one skilled in the art that this description is not specific to SNMP, and that other protocols may be used for device discovery, monitoring, or management.

At least one aspect of the present disclosure is directed to a system for managing remote devices. In some embodiments, the system includes a server comprising one or more processors, a memory element, a detection module executing on the one or more processors of the server, and a collection module executing on the server. The memory element stores, in a first data structure, a management information base (MIB) having a hierarchical tree comprising a plurality of object identifiers and a plurality of corresponding object values. The detection module queries one or more devices and receives, responsive to a query, a first object identifier and a corresponding first object value from a device, the first object identifier varies from the plurality of object identifiers of the MIB, and the first object value varies from the plurality of corresponding object values of the MIB. The detection module generates, using a first pattern that matches the first object identifier and a second pattern that matches the first object value, an identification of the device. The collection module selects a collection template from a plurality of collection templates based on the identification of the device, the collection template indicating a subtree of the MIB and comprising a collection pattern. The collection module traverses the subtree using the collection template to identify a second object identifier that matches the collection pattern and a corresponding second object value, the second object identifier varies from the plurality of object identifiers of the MIB. The collection module associates, in a second data structure in the memory, the second object value with the first object value based on the collection template.

In some embodiments, at least one of the first pattern, the second pattern or the collection pattern can be based on a regular expression.

In some embodiments, the collection module is further configured to traverse the subtree using the collection template to identify each object identifier that matches the collection pattern, and associate each corresponding object value with the first object value and the second object value in the second data structure in the memory.

In some embodiments, a collection group further indicates a starting point within the hierarchical tree of the MIB and comprises the first pattern, the second pattern, and the collection template. The detection module can generate, scanning from the starting point, using the first pattern that matches the first object identifier and the second pattern that matches the first object value, the identification of the device. The collection module can traverse the subtree, scanning from the starting point, using the collection template to identify the second object identifier.

At least one of the first object identifier or the second object identifier can further be based on an X.690 object identifier.

At least one of the first object identifier or the second object identifier can further be represented by at least one of a numeric representation or a symbolic representation.

The collection pattern can further be based on a regular expression comprising a named group that indicates a relationship between the second object value and the first object value.

Another aspect of the present disclosure is directed to a method for managing remote devices. The method includes a server comprising one or more processors, a memory element, a detection module executing on the one or more processors of the server, and a collection module executing on the server. The method includes the memory element storing, in a first data structure, a management information base (MIB) having a hierarchical tree comprising a plurality of object identifiers and a plurality of corresponding object values. The method includes the detection module querying one or more devices and receiving, responsive to a query, a first object identifier and a corresponding first object value from a device, the first object identifier varying from the plurality of object identifiers of the MIB, and the first object value varying from the plurality of corresponding object values of the MIB. The method includes the detection module generating, using a first pattern that matches the first object identifier and a second pattern that matches the first object value, an identification of the device. The method includes the collection module selecting, a collection template from a plurality of collection templates based on the identification of the device, the collection template indicating a subtree of the MIB and comprising a collection pattern. The method includes the collection module traversing, the subtree using the collection template to identify a second object identifier that matches the collection pattern and a corresponding second object value, the second object identifier varies from the plurality of object identifiers of the MIB. The method includes the collection module associating, in a second data structure in the memory, the second object value with the first object value based on the collection template.

Yet another aspect of the present disclosure is directed to a non-transitory computer readable medium storing instructions that, when executed by one or more processors, facilitate managing remote devices. The instructions include instructions to store, in a memory element of a server comprising one or more processors, in a first data structure, a management information base (MIB) having a hierarchical tree comprising a plurality of object identifiers and a plurality of corresponding object values. The instructions include instructions to query, by a detection module executing on the one or more processors of the server, one or more devices and receive, responsive to a query, a first object identifier and a corresponding first object value from a device, the first object identifier varying from the plurality of object identifiers of the MIB, and the first object value varying from the plurality of corresponding object values of the MIB; The instructions include instructions to generate, by the detection module, using a first pattern that matches the first object identifier and a second pattern that matches the first object value, an identification of the device. The instructions include instructions to select, by a collection module executing on the server, a collection template from a plurality of collection templates based on the identification of the device, the collection template indicating a subtree of the MIB and comprising a collection pattern. The instructions include instructions to traverse, by the collection module, the subtree using the collection template to identify a second object identifier that matches the collection pattern and a corresponding second object value, the second object identifier varies from the plurality of object identifiers of the MIB. The instructions include instructions to associate, by the collection module, in a second data structure in the memory, the second object value with the first object value based on the collection template.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description and the drawings.

FIG. 4A is an illustrative table representing an example embodiment of a request for the value of a single object.

FIG. 4B is an illustrative table representing an example embodiment of a response to a request for the value of a single object.

FIG. 4C is an illustrative table representing an example embodiment of a request for the values of a series of objects.

FIG. 4D is an illustrative table representing an example embodiment of a response to a request for the values of a series of objects.

FIG. 4E is an illustrative table representing an example embodiment of a request for the value of a single indexed object.

FIG. 4F is an illustrative table representing an example embodiment of a response to a request for the value of a single indexed object.

FIG. 4G is an illustrative table representing an example embodiment of a request for the values of an indexed table of objects.

FIG. 4H is an illustrative table representing an example embodiment of a response to a request for the values of an indexed table of objects.

FIG. 5 is an illustrative example of an example embodiment of a user interface for displaying and updating a discovery rule.

FIG. 6A is an illustrative table representing an example embodiment of a hierarchy of object identifiers for an indexed table of objects.

FIG. 6B is an illustrative example of an example embodiment of a user interface for displaying and updating a collection rule.

FIG. 6C is an illustrative table representing an example embodiment of a database table including an indexed table of information about a device.

FIG. 7 is an illustrative example of an example embodiment of a user interface for displaying and updating a collection group.

Like reference numbers and designations in the various drawings indicate like elements.

DETAILED DESCRIPTION

Figure 1:
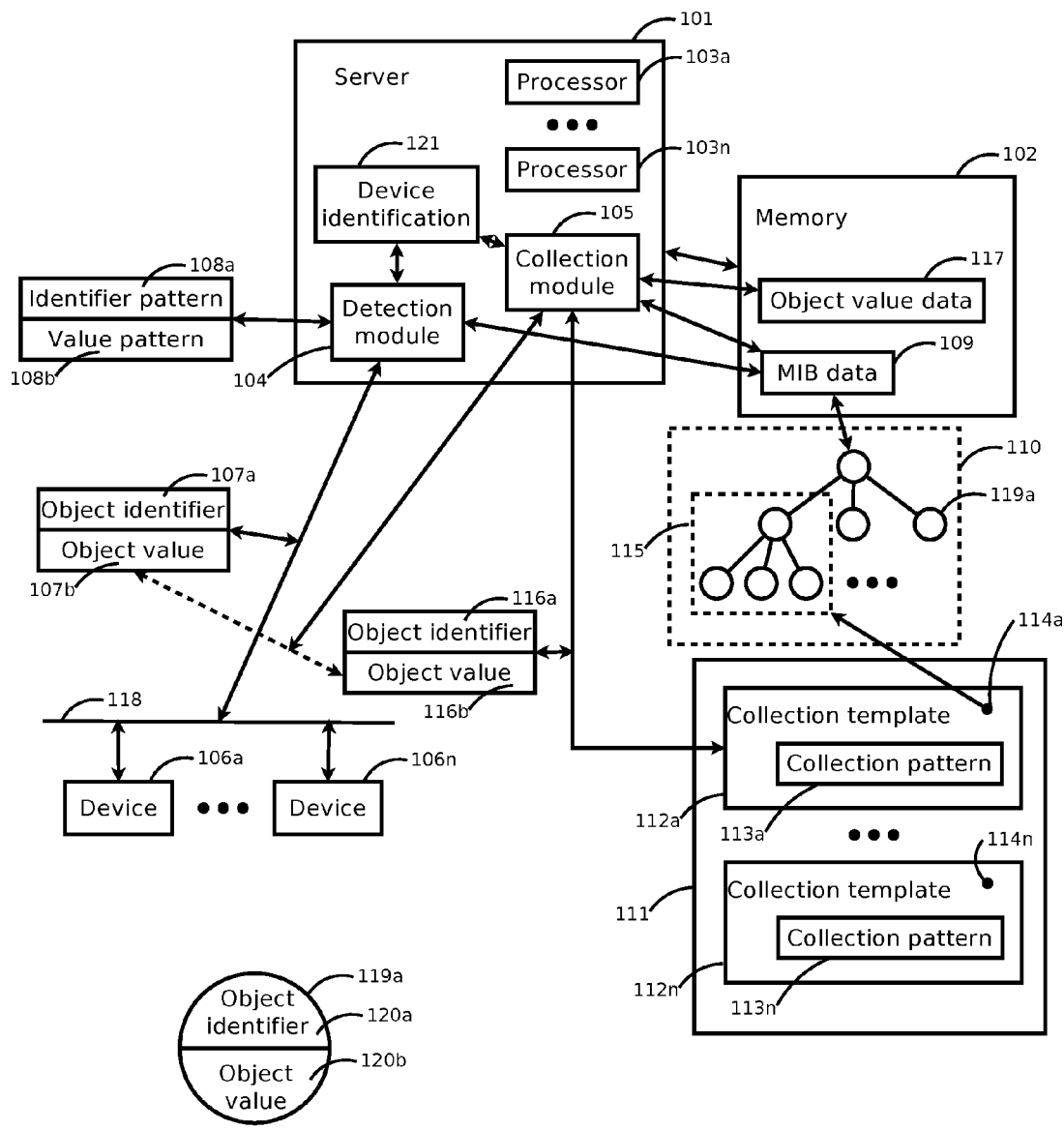
FIG. 1 is an illustrative block diagram of an example embodiment of a system for discovering and monitoring devices using search patterns for object identifiers and values.

Systems and methods of the present disclosure can facilitate discovering devices in a network, collecting information from those devices, and managing those devices. A system administrator can use a Remote Monitoring and Management (RMM) software tool to facilitate automating the management of devices in a network. The RMM software can include a discovery module that finds, identifies, and classifies the devices. The RMM software may find and use existing lists of devices, or may use network scanning techniques, in order to find the devices. The RMM software may query the devices using a standard management protocol in order to identify the devices, and also to monitor or update the features, settings, and status of the devices. The RMM software may further access the devices using a standard management protocol in order to update the settings and status of the devices. The standard management protocol implemented by the devices may represent the devices, features of the devices, and settings of the devices as objects. These objects may include object identifiers (OIDs), which can serve as a way to address the objects, and the objects may include values, which can serve as a way to access and store information about the devices such as settings and status. The objects can be standard objects that are part of the standard management protocol and apply to devices independent of the vendor, or the objects can be defined by a vendor and may be specific to that vendor's products.

In one embodiment, the RMM software may be configured to use the Simple Network Management Protocol (SNMP) for device discovery, monitoring, and management. The OIDs may use the OID hierarchy defined by the Internet Assigned Numbers Authority (IANA), and the first and third patterns may match either the numeric form of those OIDs or the symbolic form, where the OID at some or all levels in the hierarchy is represented by a short string of characters. The collection of objects associated with a specific device may be stored as a Management Information Block (MIB).

SNMP can represent everything about a device as an "object". An object can include a value, which can be a number, a string, a table, or some other data type. An object can also include an identifier, called an OID. An object that is a table can include an index, which can be used to reference different entries in the table. SNMP supports reading an object, which can get data from a device, and writing an object, which can update a setting on a device. SNMP also supports reading a group of objects sequentially (SNMP GETNEXT operation). SNMP also supports reading a group of objects in a single operation (SNMP GETBULK operation), which may use less network bandwidth than operating on the objects one at a time.

SNMP OIDs can be a series of numbers separated by dots, such as 1.3.6.1.2.1.1.1, where the numbers can represent a selection from options at one level in a tree, and can define the meaning of the options in the next level of the tree. It may be preferable to use the X.690 standard for SNMP OIDs. In the X.690 standard, the initial "1" can select "iso", which is a specific subset of standards, and selects a set of values for the next level, from which the next "3" can select "identified-organizations", which in turn selects a set of values from which 6 can select "dod" for the US Department of Defense, and so on. The OIDs can be written in their numerical form, like 1.3.6.1, or the OIDs can be written in a symbolic form using those values, like iso.identified-organizations.dod.internet (which can be the symbolic form of 1.3.6.1).

A particular device that implements SNMP can include a set of objects associated with the device. An object can include attributes such as an OID, a data type, a set of supported operations (such as SNMP GET and SNMP SET), some additional information such as a description, and so on. The definition of an object and its attributes can be stored in a management information base (MIB) that can be associated with the device.

A MIB may be stored in a standardized format that can be read and used by the RMM software. This standardization may facilitate the use of the software with devices made by vendors who have released object information in this format. For example, SNMP MIBs can be stored in a format based on a subset of ANS.1. The RMM software may also support extensions and modifications to a standardized format for storing objects. For example, some MIBs may be stored using slightly different subsets of ANS.1, or even extensions of the ANS.1 standard, so the RMM software may support formats outside of the standard definition for reading MIBs. A pattern-matching module may be used to determine whether a string matches a pattern. In one embodiment, the pattern-matching module may use a regular expression as the pattern. A regular expression represents a sequence of characters with a specific syntax that represents a search pattern for use in string matching. The pattern-matching module may use an implementation of a regular expression matcher to determine whether the string matches the pattern. The pattern-matching module may also use other implementations of a description of a pattern for matching strings.

A discovery module may enumerate the OIDs associated with a device. The discovery module may enumerate OIDs by requesting, from a device, a list of OIDs supported by the device, or a subset of the list of OIDs supported by the device. The discovery module may also enumerate OIDs by using the OIDs, or a subset of the OIDs, defined by a MIB. The discovery module may enumerate OIDs by using a combination of the two methods. The discovery module can use the pattern-matching module to check whether or not some or all of the OIDs in the list matches a first pattern associated with the device. The pattern matching may be done against a numeric representation of the OID, a symbolic representation of the OID, or both. The discovery module can query the device for some or all of the objects identified by the matching OIDs, and may use the pattern-matching module to check whether or not the value of one or more of the object values match a second pattern associated with the device. If a value matches the second pattern, the discovery module can indicate that the device has been discovered. The information about the first and second patterns associated with a device can be stored in a discovery rule.

In an illustrative example, a network administrator may want to enable an RMM system to discover laser printers made by a manufacturer, such as HEWLETT PACKARD™, and classify the devices correctly as printers. The network administrator may not wish to access the MIBs for some or all of the devices sold by HEWLETT PACKARD, or may not wish to keep those MIBs up to date. However, the administrator may know that some or all HEWLETT PACKARD printers may respond to SNMP requests for either the device name or the printer name with a string starting with the word "HP" followed by a space, and including either "Jet" or "jet". The OID for the device name can be 1.3.6.1.2.1.1, and the OID for the printer name can be 1.3.6.1.2.1.43. The resulting object value may be a string with a value such as "HP Color LaserJet 2600n", or "HP LaserJet Pro M521dn", or "HP Deskjet 6540", or some similar string, but may always start with "HP" followed by a space, including either "Jet" or "jet". The network administrator can specify a discovery rule using a first pattern of:

^1\.3\.6\.1\.2\.1\.[1|43]$ and a second pattern of:

^HP.*[Jj]et

In the first pattern, the ^ and $ characters can indicate that the first pattern may match the entire string of the OID, not just a subset. The \. characters in the first pattern may represent quoted periods, indicating that this part of the pattern can match a literal period in the string. The numbers in the first pattern are actual characters that match the same characters in the string. The [1|43] in the first pattern may be a "choice" that can match either a 1 or a 43 in the string. The first pattern may match either 1.3.6.1.2.1.1 or 1.3.6.1.2.1.43 for the OID.

In the second pattern, the ^ can indicate that the second pattern may match the beginning of the string, and the HP and space in the second pattern may be literal characters that can match an HP and a space at the beginning of the string. The .* in the second pattern can match zero or more characters in the string (the . can match any character, and the * can repeat the match). The [Jj] in the second pattern can match either "J" or "j" in the string, and the et in the second pattern can matches "et" in the string. The lack of a $ at the end of the second pattern may indicate that extra characters at the end of the string will be ignored. The second pattern may match values such as "HP Color LaserJet 2600n", or "HP LaserJet Pro M521dn", or "HP Deskjet 6540", as well as other similar strings. As a result, the first and second patterns described can be used in a discovery rule that may correctly identify a variety of HEWLETT PACKARD printers as desired.

A collection module may enumerate the OIDs associated with a device, using the methods already described for enumerating OIDs, and then use the pattern-matching module to check whether or not some or all of the OIDs in the list matches a third pattern associated with the device. If an OID matches the third pattern, the collection module can query the device for the value of the object addressed by the OID. The third pattern can include information directing what to do with the value returned by the device. For example, the information may direct the collection module to store the information in a specific column of a table in a relational database. The information about the third pattern associated with the device can be stored in a collection rule.

In an illustrative example, a network administrator may want to collect the name and bandwidth of the network interface of a device. In the SNMP OID representation, the ifDescr object for an interface can be a table of strings that represent the names of the interfaces on the device, with an OID of 1.3.6.1.2.1.2.2.1.2, so the names of the interfaces may be represented by the objects with OIDs 1.3.6.1.2.1.2.2.1.2.n where n can represent the index of the interface. Similarly, the ifSpeed object for an interface can be a table of integers that represent the bandwidth of the interfaces on the device in bits per second, with an OID of 1.3.6.1.2.1.2.2.1.5, so the bandwidth of the interfaces may be represented by the objects with OIDs 1.3.6.1.2.1.2.2.1.5.n where n can represent the index of the interface.

The network administrator may want to store the interface number, name, and bandwidth of some or all of the interfaces in a row of a relational database, storing the interface number in a column Idx, the name in a column Desc, and the bandwidth in bits per second in a column Spd. The network administrator can use a pattern in the collection rule of:

^1\.3\.6\.1\.2\.1\.2\.2\.1\.(?<Desc>2)|(?<Spd>5)\.(?<Idx>[0-9]*)$

The ^ and $ characters can indicate that the pattern matches the entire string of the OID, not just a subset. The \. characters in the pattern can be quoted periods, indicating that this part of the pattern may match a literal period in the OID. The numbers, including the number 2 in (?<Desc>2) and the number 5 in (?<Spd>5), in the pattern can be actual characters that may match the same characters in the string. The [0-9]* in the third pattern can match zero or more digits in the string. The third pattern can match either 1.3.6.1.2.1.2.2.1.2.n or 1.3.6.1.2.1.2.2.1.5.n, where n is a number.

The notation (?<name>pattern) can have a special meaning in a regular expression; this notation can be called a named group, and can mean that the text matched by pattern is captured in the group named name. The pattern can use this notation to indicate that the index value (the last number) may be stored into a database column named "Idx", the object values returned from an object with OID 1.3.6.1.2.1.2.2.1.2.n may be stored into a database column "Desc", and the object values returned from an object with OID 1.3.6.1.2.1.2.2.1.5.n may be stored into a database column "Desc". As a result, this pattern may store the index, name, and bandwidth in bits per second of an interface into the relational database as desired.

One skilled in the art will recognize that the simple enumeration and filtering of OIDs described here can be optimized in practice. For example, the system may be able to use the specific value of the first or third pattern to greatly restrict the space of OIDs that the first or third pattern might match, and thereby enumerate a smaller list of OIDs. The resulting optimization may save resources such as time, memory, and network bandwidth, and may also reduce the impact on the devices being monitored.

To continue the example collection pattern described previously, the system may determine that only the two table objects with OIDs of 1.3.6.1.2.1.2.2.1.2 and 1.3.6.1.2.1.2.2.1.5 may match the pattern, and may therefore limit the SNMP GET commands to only query those two OIDs.

The collection module may implement special data collection strategies based on the results of the detection module. The collection module may also use special data collection strategies independent of the results of the detection module. For example, some devices may have an error that prevents the device from returning the last value in a table when doing an SNMP GET operation on the table. If a printer includes four ink cartridges, an SNMP GETBULK operation to get the OIDs in the subtree for the ink cartridges may only get the information for three of the cartridges, but doing successive SNMP GETNEXT operations may return information for four cartridges. In this example, the collection module may implement the collection operation using only GETNEXT so as to avoid data loss.

The collection module may organize one or more discovery rules or collection rules into a collection group. The resulting collection group can be used to discover or collect related sets of information from devices. Different collection groups can use different subsets of discovery rules or collection rules to discover or collect the appropriate sets of information from different devices. Collection groups can be applied to specific levels in the object hierarchy, and the first and third patterns in the discovery rules and collection rules in the collection groups can be interpreted relative to the point in the object hierarchy where the collection group is applied. In this way, collection groups can represent a general mechanism for describing the discovery and collection of device information, and that mechanism can be applied to different features of different devices as appropriate.

In an illustrative example, a vendor may manufacture a stacked Ethernet switch with multiple cores that can be managed independently. It may be possible to have a single MIB manage the cores, by having objects in the MIB be tables indexed by the core number, but this configuration may cause some problems. For example, this configuration may make it difficult to include tables such as a table of network interfaces for the cores, since the MIB objects may not directly support tables of tables. In another example, this configuration may make it difficult to separate the management functions of the entire device from the management functions of the multiple cores. For these and other reasons, it may be desirable to organize the MIB with a separate subtree for some or all of the cores, where the subtrees have the same organization. It may be desirable to have one object that is a single table with object values that are the OIDs of the roots of the tree for the cores.

To continue the illustrative example, a vendor may register a private OID of 1.3.6.1.4.1.99999 and then define a series of OIDs under that. For example, 1.3.6.1.4.1.99999.1 may represent a table of OIDs that are the base OIDs for the subtrees for the cores. Continuing the example, 1.3.6.1.4.1.99999.2 may be reserved as the root for the subtrees for the cores. Within a core subtree, the standard OID tree under the MIB-2 tree (1.3.6.1.2.1) may be duplicated, where OIDs in the standard tree apply to the core. For example, the sysDescr object described previously for the printer name, has an OID of 1.3.6.1.2.1.1.1, so the sysDescr for core n in this vendor's stacked switch may be 1.3.6.1.4.1.99999.2.n.1.1; the 1.3.6.1.4.1.99999.2 is the private OID for the root of the cores, the n selects core n, and the 1.1 selects the sysDescr object.

In this example definition, the collection rule previously described for storing the interface number, name, and bandwidth of an interface into a row of a relational database can be modified to be relative to a base, which may give a collection rule such as:

^(\.[0-9]*)?\.2\.2\.1\.(?<Desc>2)|(?<Spd>5)\.(?<Idx>[0-9]*)$ and this collection rule may be used in a first collection group with a base OID of 1.3.6.1.4.1.99999.2. The first part of the collection rule, "(\.[0-9]*)?" indicates that there may be one additional level in the OID before the .2.2.1 subtree; this additional level may be the core number. This collection rule may also be used in a second collection group with a base OID of 1.3.6.1.2.1, which can make the collection rule collect information from a single switch that is not stacked but may use the standard OID layout. In the case with 1.3.6.1.2.1 as the base for the subtree, there may be no core number. In this example, the first collection group can use a discovery rule that correctly detects the stacked switch, and the second collection group can use a discovery rule that correctly detects the single switch. In this way, using collection groups may allow the use of one collection rule to monitor data that is in different parts of the OID tree for different devices.

Although some of the examples given have been described using SNMP as a protocol, it will be apparent to one skilled in the art that this description is not specific to SNMP, and that other protocols may be used for device discovery, monitoring, or management.

FIG. 1 is an illustrative block diagram of an example embodiment of a system for discovering and monitoring devices using search patterns for object identifiers and values. The system can include a server 101 that can include one or more processors 103a-103n, a detection module 104 executing on the processors 103a-103n of the server 101, a collection module 105 executing on the processors 103a-103n of the server 101, and a memory 102.

The memory 102 can contain a data structure 109 with data for a management information base (MIB). The MIB can represent a hierarchical tree 110 with nodes such as 119a (for clarity, only one node is labeled in FIG. 1). As the legend in FIG. 1 indicates, a node such as 119a in the tree can have an object identifier 120a and an object value 120b.

The detection module 104 can query one or more devices 106a-106n, and receive from the query an object identifier 107a and an associated object value 107b from one of the devices 106a-106n. In some embodiments, the query can be done using a network 118. The object identifier 107a may not be the same as any of the object identifiers like 120a in the hierarchical tree 110 represented by the MIB 109. Similarly, the object value 107b may not be the same as any of the object values like 120b in the hierarchical tree 110 represented by the MIB 109. The meaning of this may be that the MIB 109 does not correspond to the device (from the devices 106a-106n) that is responding to the query, and so the MIB 109 may not be usable to identify the device.

The detection module 104 may be able to use an identifier pattern 108a and a value pattern 108b, where the identifier pattern 108a matches the object identifier 107a and the value pattern 108b matches the object value 107b, to generate a device identification 121. The collection module 105 can use this device identification 121 to select a collection template 112a from a list 111 of collection templates 112a-112n. A collection template 112a can include a collection pattern 113a and a pointer 114a to a subtree 115 of the hierarchical tree 110 of the MIB 109.

The collection module 105 can traverse the subtree 115 of the MIB 109 and identify an object identifier 116a from a node like 119a that matches the collection pattern 113a, along with the object value 116b that is associated with the object identifier 116a. The collection module 105 can then make an association between the object value 107b and the object value 116b, and can store that association as object value data 117 in the memory 102.

The network can include a local-area network (LAN), such as a company Intranet, a metropolitan area network (MAN), or a wide area network (WAN), such as the Internet or the World Wide Web. In some embodiments, there are multiple networks between the devices and the servers. In one of these embodiments, the network may be a public network, a private network, or may include combinations of public and private networks.

The network may be any type or form of network and may include one or more of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network may include a wireless link, such as an infrared channel or satellite band. The topology of the network may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some embodiments, different types of data may be transmitted via different protocols. In other embodiments, the same types of data may be transmitted via different protocols.

The system and its components, such as a server 101, processors 103a-103n, memory 102, detection module 104, collection module 105, and devices 106a-106n, may include hardware elements, such as one or more processors, logic devices, or circuits. For example, the system and its components may include a bus or other communication component for communicating information and a processor or processing circuit coupled to the bus for processing information. The hardware elements can also include one or more processors or processing circuits coupled to the bus for processing information. The system also includes main memory, such as a random access memory (RAM) or other dynamic storage device, coupled to the bus for storing information, and instructions to be executed by the processor. Main memory can also be used for storing position information, temporary variables, or other intermediate information during execution of instructions by the processor. The system may further include a read only memory (ROM) or other static storage device coupled to the bus for storing static information and instructions for the processor. A storage device, such as a solid state device, magnetic disk or optical disk, can be coupled to the bus for persistently storing information and instructions.

The system and its components, such as a server 101, processors 103a-103n, memory 102, detection module 104, collection module 105, and devices 106a-106n, may include, e.g., computing devices, desktop computers, laptop computers, notebook computers, mobile or portable computing devices, tablet computers, smartphones, personal digital assistants, or any other computing device.

According to various embodiments, the processes described herein can be implemented by the system or hardware components in response to the one or more processors executing an arrangement of instructions contained in memory. Such instructions can be read into memory from another computer-readable medium, such as a storage device. Execution of the arrangement of instructions contained in memory causes the system to perform the illustrative processes described herein. One or more processors in a multi-processing arrangement may also be employed to execute the instructions contained in memory. In some embodiments, hard-wired circuitry may be used in place of or in combination with software instructions to effect illustrative embodiments. Thus, embodiments are not limited to any specific combination of hardware circuitry and software. To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

In some embodiments, the one or more servers associated with the server 101, detection module 104, collection module 105, devices 106a-106n, or memory 102 may not need to be physically proximate to each other or in the same machine farm. Thus, the servers logically grouped as a machine farm may be interconnected using a wide-area network (WAN) connection or a metropolitan-area network (MAN) connection. For example, a machine farm may include servers physically located in different continents or different regions of a continent, country, state, city, campus, or room. Data transmission speeds between servers in the machine farm can be increased if the servers are connected using a local-area network (LAN) connection or some form of direct connection.

Management of the servers may be de-centralized. For example, one or more servers may comprise components, subsystems and circuits to support one or more management services. In one of these embodiments, one or more servers provide functionality for management of dynamic data, including techniques for handling failover, data replication, and increasing robustness. Each server may communicate with a persistent store and, in some embodiments, with a dynamic store.

A server may include a file server, application server, web server, proxy server, appliance, network appliance, gateway, gateway, gateway server, virtualization server, deployment server, secure sockets layer virtual private network ("SSL VPN") server, or firewall. In one embodiment, the server may be referred to as a remote machine or a node. In one embodiment, the server may be referred to as a cloud.

Figure 2:
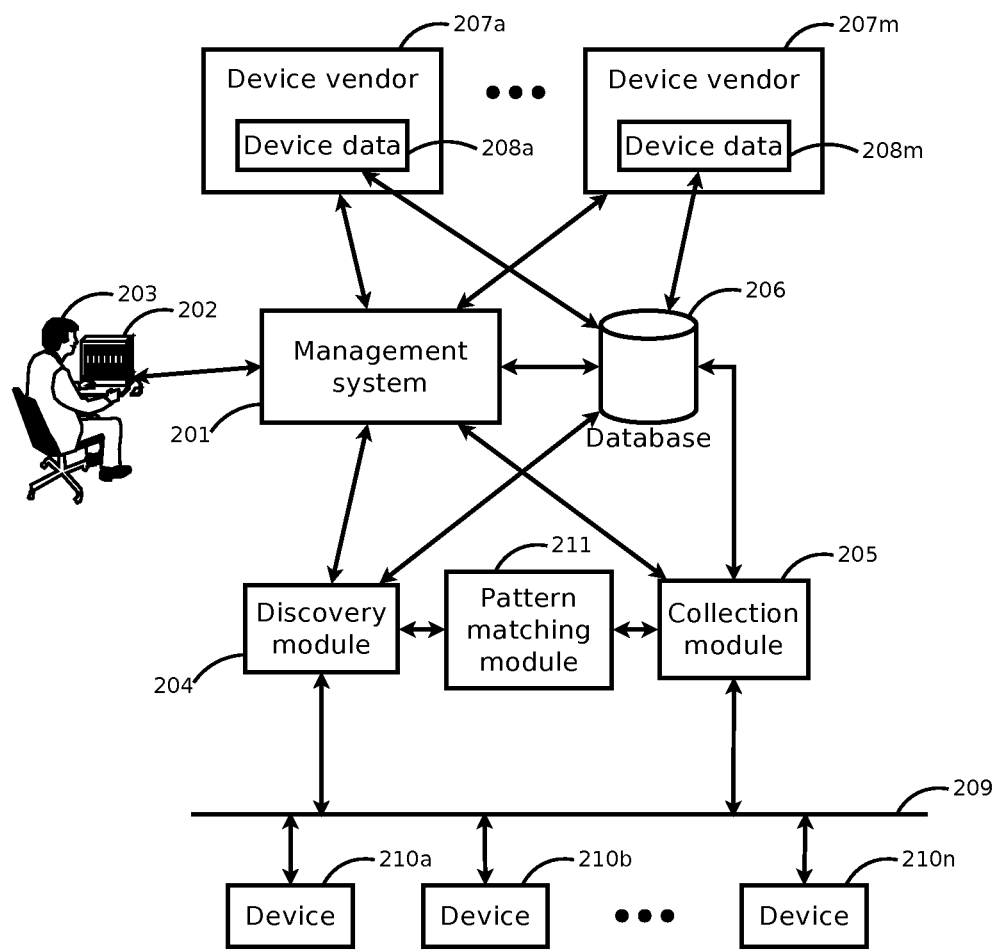
FIG. 2 is an illustrative block diagram of an example embodiment of a system for discovering and monitoring devices using search patterns for object identifiers and values.

FIG. 2 is an illustrative block diagram of an example embodiment of a system for discovering and monitoring devices using search patterns for object identifiers and values. A network administrator 203 can use a device 202 to access a management system 201 to manage a network 209. The network can include devices 210a-210n. The management system 201 can use a discovery module 204 to discover the devices 210a-210n, and the discovery module 204 can update a database 206 with information about the devices 210a-210n. The management system 201 can use a collection module 205 to collect information from the devices 210a-210n, and can use the information to update the database 206. The discovery module 204 and the collection module 205 can use a pattern matching module 211 to facilitate the discovery, monitoring, and management of the devices 210a-210n. In order to correctly discover the devices 210a-210n and collect information from these devices, the management system 201 may access device data 208a-208m from device vendors 207a-207m. The management system 201 may be able to access the device vendors 207a-207m and transfer the device data 208a-208m to the database 206.

In some embodiments, the management system 201 in FIG. 2 can include components or functionality of the server 101 as described with respect to FIG. 1. In some embodiments, the database 206 in FIG. 2 can include components or functionality of the memory 102 as described with respect to FIG. 1. In some embodiments, the discovery module 204 in FIG. 2 can include components or functionality of the detection module 104 as described with respect to FIG. 1. In some embodiments, the collection module 205 in FIG. 2 can include components or functionality of the collection module 105 as described with respect to FIG. 1. In some embodiments, the network 209 in FIG. 2 can include components or functionality of the network 118 as described with respect to FIG. 1. In some embodiments, the devices 210a-210n in FIG. 2 can include components or functionality of the devices 106a-106n as described with respect to FIG. 1.

Figure 3:
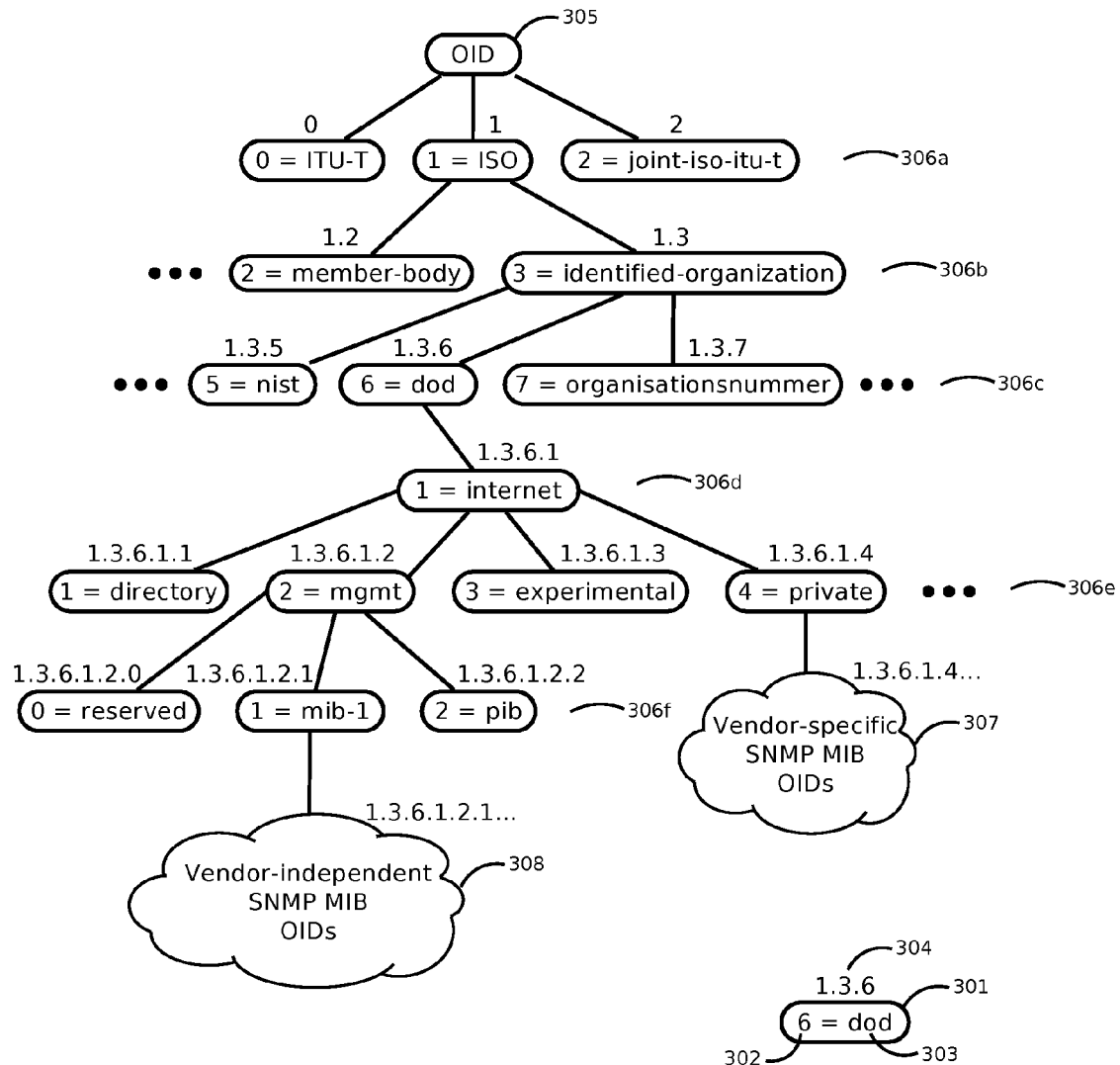
FIG. 3 is an illustrative block diagram of an example embodiment of a numbering system for object identifier names.

FIG. 3 is an illustrative block diagram of an example embodiment of a numbering system for object identifier names. The root of the system 305 can be represented as "OID" and can serve as the starting point for defining an object identifier (OID). OIDs can be represented as a sequence of numbers separated by periods. One level 306a-306f in the tree can represent one number in the OID. The legend in the lower right corner describes the notation used in the diagram: a node 301 in the tree can have a numeric identifier 302 and a symbolic identifier 303. An OID may be formed in traversing the tree from the root 305 to the node 301 and is shown in numerical form 304 above the node 301 for convenience.

The naming convention for an OID can be formed by concatenating the numeric or symbolic identifiers of the nodes that are traversed in order to reach the node for the OID. For example, the node labeled "2=mgmt" in level 306e is reached by traversing the nodes "1=ISO", "3=identified-organization", "6=dod", "1=internet", and finally "2=mgmt", so its OID may be formed as either 1.3.6.1.2 or ISO.identified-organization.dod.internet.mgmt, depending on which may be more convenient. The alternatives in a single level 306a-306f may represent choices of a particular aspect of the object. For example the alternatives in level 306c may represent the organization that is responsible for defining and maintaining the objects, with "5=nist" representing the National Institute of Standards and Technology (NIST), "6=dod" representing the United States Department of Defense (DOD), and so on.

The specific values used in the embodiment shown in FIG. 3 are taken from the OID hierarchical naming scheme that is defined by the Internet Assigned Numbers Authority (IANA), which is the OID naming scheme used by the Simple Network Management Protocol (SNMP). It should be understood that this is just one embodiment, and the present disclosure is not limited to the IANA OID naming scheme, and is not limited to use with SNMP. However, by way of illustration, most OIDs used in actually managing devices with SNMP can be either vendor-independent OIDs that are in the subtree 308, or vendor-specific OIDs that are in the subtree 307. The name of OIDs in subtree 308 may start with 1.3.6.1.2.1, and the name of OIDs in subtree 307 may start with 1.3.6.1.4.

In some embodiments, the OID tree shown in FIG. 3 can include components or functionality of the hierarchical tree 110 as described with respect to FIG. 1.

FIG. 4A is an illustrative table representing an example embodiment of a request for the value of a single object. The embodiment in FIG. 4A can be an SNMP message, which can use the Abstract Syntax Notation One (ASN.1) format. ASN.1 format is a sequence of bytes, which are shown in FIG. 4A using hexadecimal notation with two characters per byte. The first byte indicates the type of the next item, and the following byte indicates its length in bytes. The next bytes are the value of the item. For convenience, FIG. 4A shows labels for each data item, and indents the data item under the item type and length.

The entire message can be an SNMP message 401a, which can be a sequence, indicated by a type 401b of 30 hex, with a length 401c of 41 bytes, indicated by 29 hex. The sequence can be a list of three items: an SNMP version 402a, a community string 403a, and a Protocol Data Unit (PDU) 404a. The SNMP version 402a can be an integer, indicated by a type 402b of 02 hex, with a length 402c of 1 byte, indicated by 01 hex, and a value 402d of 1 indicated by 01 hex. The value of 1 for the SNMP version can indicate that this message can be using SNMPv2c. The community string 403a can be an octet string, indicated by a type 403b of 04 hex, with a length 403c of 6 bytes, indicated by 06 hex, and a value 403d of "public" indicated by the series of bytes 70 75 62 6c 69 63 hex. The community string can be a "password" that matches an internal setting in the device in order for the device to respond to SNMP requests.

The PDU 404a can be an SNMP GET request, indicated by a type 404b of a0 hex, with a length 404c of 28 bytes, indicated by 1c hex. The value of an SNMP GET request, as defined by the protocol, can be a request ID 405a, an error 405e, an error index 405i, and a varbind list 405m. The request ID 405a can be an integer, indicated by a type 405b of 02 hex, with a length 405c of 4 bytes, indicated by 04 hex, and a value 405d of 1,286,658,518 indicated by 4c b0 d9 d6 hex. The request ID can be a randomly generated number that is used by the software to match responses with the requests that invoked the responses. The error 405e can be an integer, indicated by a type 405f of 02 hex, with a length 405g of 1 byte, indicated by 01 hex, and a value 405h of 0 indicated by 00 hex. The error index 405i can be an integer, indicated by a type 405j of 02 hex, with a length 405k of 1 byte, indicated by 01 hex, and a value 405l of 0 indicated by 00 hex. The error and error index may only be meaningful in responses, and may be set to 0 in requests such as shown in FIG. 4A.

The varbind list 405m can list the OIDs of objects whose values are being requested, and can be organized as a sequence of variables. Variables can be a sequence of two items representing an OID and an object value. In an SNMP GET request, the request includes no object values, so the object values can be set to NULL. The details are shown in FIG. 4A, with the varbind list 405m being a sequence, indicated by a type 405n of 30 hex, with a length 405o of 14 bytes, indicated by 0e hex. The value of the varbind list 405m can include a single variable 406a, which can be a sequence, as indicated by a type 406b of 30 hex, and having a length 406c of 12 bytes, indicated by 0c hex. The variable 406a can include an OID 407a and an object value 407e. The OID 407a can have a type 407b of 06 hex, with a length 407c of 8 bytes, indicated by 08 hex. The value of the OID can be 1.3.6.1.2.1.1.5.0, indicated by the 8 hex bytes 2b 06 01 02 01 01 05 00. The object value 407e can have a type 407f NULL indicated by 05 hex, and a length 407g of 0 bytes, indicated by 00 hex.

By way of explanation, the OID referenced by FIG. 4A, 1.3.6.1.2.1.1.5.0 includes two parts. The first part, 1.3.6.1.2.1.1.5, is an IANA OID with the symbolic name iso.identified-organization.dod.internet.mgmt.mib-2.system.sysName. This OID is defined to reference an object that is "an administratively-assigned name for this managed node. By convention, this is the node's fully-qualified domain name". The last digit, 0, is the index, and is set to zero when referencing objects with values that only include a single value, such as string values.

FIG. 4B is an illustrative table representing an example embodiment of a response to a request for the value of a single object. The embodiment in FIG. 4B can be an SNMP message, and FIG. 4B uses the same display notation as FIG. 4A.

The entire message can be an SNMP message 411a, which can be a sequence, indicated by a type 411b of 30 hex, with a length 411c of 54 bytes, indicated by 36 hex. The sequence can be a list of three items: an SNMP version 412a, a community string 413a, and a Protocol Data Unit (PDU) 414a. The SNMP version 412a can be an integer, indicated by a type 412b of 02 hex, with a length 412c of 1 byte, indicated by 01 hex, and a value 412d of 1 indicated by 01 hex. The value of 1 for the SNMP version can indicate that this message can be using SNMPv2c. The community string 413a can be an octet string, indicated by a type 413b of 04 hex, with a length 413c of 6 bytes, indicated by 06 hex, and a value 413d of "public" indicated by the series of bytes 70 75 62 6c 69 63 hex. In a response, the community string can be returned as the community string of the device, which may be the same as the community string used in the request. In this case, FIG. 4B shows the response to the request in FIG. 4A, so the community string in FIG. 4B can be the same as that in FIG. 4A.

The PDU 414a can be an SNMP GET response, indicated by a type 414b of a2 hex, with a length 414c of 41 bytes, indicated by 29 hex. The value of an SNMP GET response, as defined by the protocol, can be a request ID 415a, an error 415e, an error index 415i, and a varbind list 415m. The request ID 415a can be an integer, indicated by a type 415b of 02 hex, with a length 415c of 4 bytes, indicated by 04 hex, and a value 415d of 1,286,658,518 indicated by 4c b0 d9 d6 hex. The request ID can be a randomly generated number that is used by the software to match responses with the requests that invoked the responses. In this case, FIG. 4B shows the response to the request in FIG. 4A, so the request ID in FIG. 4B can be the same as that in FIG. 4A. The error 415e can be an integer, indicated by a type 415f of 02 hex, with a length 415g of 1 byte, indicated by 01 hex, and a value 415h of 0 indicated by 00 hex. The error 415e can indicate the type of error returned in conjunction with the response. In this case, the error of 0 indicates that there may be no error associated with the response. The error index 415i is an integer, indicated by a type 415j of 02 hex, with a length 415k of 1 byte, indicated by 01 hex, and a value 415l of 0 indicated by 00 hex. If the error 415e is non-zero, the error index 415i includes a pointer that specifies which object generated the error. In this case, the error 415e can be 0, so the error index 415i may also be 0.

The varbind list 415m can list the OIDs whose values were requested, along with the values of the objects referenced by the OIDs, and can be organized as a sequence of variables. Variables can be a sequence of two items representing an OID and an object value. The details are shown in FIG. 4B, with the varbind list 415m being a sequence, indicated by a type 415n of 30 hex, with a length 415o of 27 bytes, indicated by 1b hex. The value of the varbind list can include a single variable 416a, which can be a sequence, as indicated by a type 416b of 30 hex, and having a length 416c of 25 bytes, indicated by 19 hex. The variable 416a can include an OID 417a and an object value 417e. The OID 417a can have a type 417b of 06 hex, with a length 417c of 8 bytes, indicated by 08 hex. The value 417d of the OID can be 1.3.6.1.2.1.1.5.0, indicated by the 8 hex bytes 2b 06 01 02 01 01 05 00. The object value 417e can be an octet string, indicated by a type 417f of 04 hex, with a length 417g of 13 bytes, indicated by 0d hex, and a value 417h of "taipei-backup", indicated by the byte string 74 61 60 70 65 2d 62 61 63 6b 75 70.

As explained previously with respect to FIG. 4A, the OID 1.3.6.1.2.1.1.5.0 can represent the sysName object, with an index of 0, and the SNMP response shown in FIG. 4B can indicate that the system name is "taipei-backup".

FIG. 4C is an illustrative table representing an example embodiment of a request for the values of a series of objects. In the interest of clarity, the format used in FIGS. 4C-H is more condensed than that used in FIG. 4A and FIG. 4B. The format used in FIGS. 4C-H omits listing the type and length fields separately, and also omits the exact byte values in the message. Instead, FIGS. 4C-H list the type and value of a field on one line, and indent fields under a description that is made up by the field. This format is modeled after the format that the network monitoring program WIRESHARK uses to display packets of information.

The entire packet 421 can be an SNMP packet, which can be made up of a version 422a, a community 422b, and data 422c. The version 422a can have a value of 1, indicating that this message can be using SNMPv2c. The community string 422b can be "public". The community string can be a "password" that matches an internal setting in the device in order for the device to respond to SNMP requests. The data 422c can be a getBulkRequest 423, which can be made up of a request-id 424a, a non-repeaters 424b, a max-repetitions 424c, and variable-bindings 424d. The getBulkRequest 423 can request the device to return a series of objects (OIDs and values). The request-id 424a can have a value of 1,359,515,446, and can be a randomly generated number that is used by the software to match responses with the requests that invoked the responses, as described with respect to FIG. 4A and FIG. 4B. The non-repeaters 424b can have a value of 0, and can indicate how many items in the variable-bindings 424d should be treated as requests for a single object. The remaining items in the variable-bindings 424d can be treated as bulk requests, and the device can return the objects supported by the device in increasing order of OID, starting with the OID in the request and continuing until the count specified by max-repetitions 424c is reached or there are no more objects. The max-repetitions 424c can have a value of 10. The variable-bindings 424d can be a list with one item 425, which can specify an OID 426 of 1.3.6.1.2.1.1 and a value 427 of Null.

By way of explanation, the OID referenced by FIG. 4C, 1.3.6.1.2.1.1, is an IANA OID with the symbolic name iso.identified-organization.dod.internet.mgmt.mib-2.system. This OID is defined to reference the system group, and "the system group includes information about the system on which the entity resides. Object in this group are useful for fault management and configuration management". Since this OID is used in a bulk request, the device will only return the objects supported by the device, but the IANA OID numbering system defines objects with OIDs starting with 1.3.6.1.2.1.1.1, 1.3.6.1.2.1.1.2, 1.3.6.1.2.1.1.3, and so on.

FIG. 4D is an illustrative table representing an example embodiment of a response to a request for the values of a series of objects. The entire packet 431 can be an SNMP packet, which can be made up of a version 432a, a community 432b, and data 432c. The version 432a can have a value of 1, indicating that this message can be using SNMPv2c. The community string 432b can be "public". In a response, the community string can be returned as the community string of the device, which may be the same as the community string used in the request. In this case, FIG. 4D shows the response to the request in FIG. 4C, so the community string in FIG. 4D can be the same as the community string in FIG. 4C. The data 432c can be a get-response 433, which can be made up of a request-id 434a, an error-status 434b, an error-index 434c, and variable-bindings 434d. The request-id 434a can have a value of 1,359,515,446, and can be a randomly generated number that is used by the software to match responses with the requests that invoked the responses. In this case, FIG. 4D shows the response to the request in FIG. 4C, so the request-id in FIG. 4D can be the same as the request-id in FIG. 4C. The error-status 434b can have a value of 0, indicating that there may be no error associated with the response. The error-index 434c can have a value of 0. If the error-status 434b is non-zero, the error-index 434b can include a pointer that can specify which object generated the error. In this case, the error-status 434b can be 0, so the error-index 434b can also be 0.

The variable-bindings 434d can be a list of 10 items 435a-435j, and the items 435a-435j can include an OID 436a-436j and an object value 437a-437j. The response shown in FIG. 4D can include 10 items because the max-repetitions 424c in the request shown in FIG. 4C was set to 10.

In the example of FIG. 4D, the response items 435a-435g can include OIDs 436a-436g that start with 1.3.6.1.2.1.1, which can be the system group as previously described with respect to FIG. 4C.

The OID 436a ending with .1.0 can be the sysDescr object, with the value 437a "Hardware: AMD64-Software: Windows 6.3". The OID 436b ending with .2.0 can be the sysObjectID object, with the value 437b 1.3.6.1.4.1.311.1.1.3.1.1. The OID 436c ending with .3.0 can be the sysUpTime object, with the value 437c 736,120. The OID 436d ending with .4.0 can be the sysContact object, with the value 437d "John Doe". The OID 436e ending with .5.0 can be the sysName object, with the value 437e "test-system". The OID 436f ending with .6.0 can be the sysLocation object, with the value 437f "Front desk". The OID 436g ending with .7.0 can be the sysServices object, with the value 437g 79. Note that the IANA OID defines 50 additional child nodes of the system group 1.3.6.1.2.1.1, but this device may not implement these objects, so the device may not return additional objects in the system group.

The response items 435h-435j can include OIDs 436h-436j that start with 1.3.6.1.2.1.1.2, which is the interfaces group, and "the interfaces object group contains information about each interface on a network device; this group provides useful information on fault management, configuration management, performance management and accounting management". The OID 436h ending with .1.0 can be the ifNumber object, with the value 437h 20. Based on the definition of the object, this value 437h means that the device can include 20 different interfaces. However, the device can only return information about the first two interfaces, because as described with respect to FIG. 4C, the max-repetitions 424c has a value of 10. The OID 436i ending with .2.1.1.1 can be the ifTable.ifEntry.ifIndex object, with an index of 1, as indicated by the last number. This ifindex object can refer to a unique value for the first interface, with the value 437i 1. The OID 436j ending with .2.1.1.2 is the ifTable.ifEntry.ifIndex object, with an index of 2, as indicated by the last number. This ifIndex object can refer to a unique value for the second interface, with the value 437j 2.

FIG. 4E is an illustrative table representing an example embodiment of a request for the value of a single indexed object. The entire packet 461 can be an SNMP packet, which can be made up of a version 462a, a community 462b, and data 462c. The version 462a can have a value of 1, indicating that this message can be using SNMPv2c. The community string 462b can be "public". The community string 462b can be a "password" that matches an internal setting in the device in order for the device to respond to SNMP requests. The data 462c can be a get-request 463, which can be made up of a request-id 464a, an error-status 464b, an error-index 464c, and variable-bindings 464d. The get-request 463 can request the device to return a series of objects (OIDs and values). The request-id 464a can have a value of 698,121,678, and can be a randomly generated number that is used by the software to match responses with the requests that invoked the responses, as described with respect to FIG. 4C and FIG. 4D. The error-status 464b and error-index 464c may only be meaningful in responses, and may be set to 0 in requests such as shown in FIG. 4E. The variable-bindings 464d can list the objects whose values are being requested, and can be organized as a list of items 465. Items 465 can include an OID 466 and a value 467. In a get-request 463, the request may include no object values, so the values 467 can be set to Null. In the example of FIG. 4E, the variable-bindings list 464d can include one item 465, which can specify an OID 466 of 1.3.6.1.2.1.2.2.1.2.1 and a value 467 of Null.

By way of explanation, the OID 466 referenced by FIG. 4E, 1.3.6.1.2.1.2.2.1.2.1, includes two parts. The first part, 1.3.6.1.2.1.2.2.1.2, is an IANA OID with the symbolic name iso.identified-organization.dod.internet.mgmt.mib-2.interface.ifTable.ifEntry.ifDescr. This OID is defined to reference "information about the interface . . . [which] should include the name of the manufacturer, the product name, and the version of the hardware interface." The last digit is the index, and is set to 1 to indicate that the request is to get information about the first interface on the device.

FIG. 4F is an illustrative table representing an example embodiment of a response to a request for the value of a single indexed object. The entire packet 471 can be an SNMP packet, which can be made up of a version 472a, a community 472b, and data 472c. The version 472a can have a value of 1, indicating that this message can be using SNMPv2c. The community string 472b can be "public". In a response, the community string can be returned as the community string of the device, which may be the same as the community string used in the request. In this case, FIG. 4F shows the response to the request in FIG. 4E, so the community string in FIG. 4F can be the same as the community string in FIG. 4E. The data 472c can be a get-response 473, which can be made up of a request-id 474a, an error-status 474b, an error-index 474c, and variable-bindings 474d. The request-id 474a can have a value of 698,121,678, and can be a randomly generated number that is used by the software to match responses with the requests that invoked the responses. In this case, FIG. 4F shows the response to the request in FIG. 4E, so the request-id in FIG. 4F can be the same as the request-id in FIG. 4E. The error-status 474b can have a value of 0, indicating that there is no error associated with the response. The error-index 474c can have a value of 0. If the error-status 474b is non-zero, the error-index 474c can include a pointer that specifies which object generated the error. In this case, the error-status 474b can be 0, so the error-index 474c can also be 0.

The variable-bindings 474d can be a list with one item 475, which can include an OID 476 and an object value 477. The OID 476 can be 1.3.6.1.2.1.2.2.1.2.1, which is the same OID 466 as the request as shown with respect to FIG. 4E, and the value 477 can be an octet string forming the character string "Software Loopback Interface 1". As described with respect to FIG. 4E, this OID 476 can be the ifDescr object for the first interface on the device, so the description of that first interface can be "Software Loopback Interface 1".

FIG. 4G is an illustrative table representing an example embodiment of a request for the values of an indexed table of objects. The entire packet 481 can be an SNMP packet, which can be made up of a version 482a, a community 482b, and data 482c. The version 482a can have a value of 1, indicating that this message can be using SNMPv2c. The community string 482b can be "public". The community string can be a "password" that matches an internal setting in the device in order for the device to respond to SNMP requests. The data 482c can be a getBulkRequest 483, which can be made up of a request-id 484a, a non-repeaters 484b, a max-repetitions 484c, and variable-bindings 484d. The getBulkRequest 483 requests the device to return a series of objects (OIDs and values). The request-id 484a can have a value of 1,254,587,219, and can be a randomly generated number that is used by the software to match responses with the requests that invoked the responses, as described with respect to FIG. 4E and FIG. 4F. The non-repeaters 484b can have a value of 0, and can indicate how many items in the variable-bindings 484d should be treated as requests for a single object. The remaining items in the variable-bindings 484d can be treated as bulk requests, and the device can return some or all of the objects supported by the device in increasing order of OID, starting with the OID in the request and continuing until the count specified by max-repetitions 484c is reached or there are no more objects. The max-repetitions 484c can have a value of 4. The variable-bindings 484d can be a list 485 with one item, which can specify an OID 486 of 1.3.6.1.2.1.2.2.1.2 and a value 487 of Null.

By way of explanation, the OID 486 referenced by FIG. 4G, 1.3.6.1.2.1.2.2.1.2, is an IANA OID with the symbolic name iso.identified-organization.dod.internet.mgmt.mib-2.interface.ifTable.ifEntry.ifDescr. This OID is defined to reference "information about the interface . . . [which] should include the name of the manufacturer, the product name, and the version of the hardware interface." This object represents multiple interfaces on the device, so this object is indexed by the interface number. Since the OID is used in a bulk request, the device can return values for the interfaces implemented by the device, with OIDs 1.3.6.1.2.1.2.2.1.2.1, 1.3.6.1.2.1.2.2.1.2.2, 1.3.6.1.2.1.2.2.1.2.3, and so on.

FIG. 4H is an illustrative table representing an example embodiment of a response to a request for the values of an indexed table of objects. The entire packet 491 can be an SNMP packet, which can be made up of a version 492a, a community 492b, and data 492c. The version 492a can have a value of 1, indicating that this message can be using SNMPv2c. The community string 492b can be "public". In a response, the community string can be returned as the community string of the device, which may be the same as the community string used in the request. In this case, FIG. 4H can show the response to the request in FIG. 4G, so the community string in FIG. 4H can be the same as the community string in FIG. 4G. The data 492c can be a get-response 493, which can be made up of a request-id 494a, an error-status 494b, an error-index 494c, and variable-bindings 494d. The request-id 494a can have a value of 1,254,587,219, and can be a randomly generated number that can be used by the software to match responses with the requests that invoked the responses. In this case, FIG. 4H shows the response to the request in FIG. 4G, so the request-id in FIG. 4H can be the same as the request-id in FIG. 4G. The error-status 494b can have a value of 0, indicating that there is no error associated with the response. The error-index 494c can have a value of 0. If the error-status 494b is non-zero, the error-index 494c can include a pointer that specifies which object generated the error. In this case, the error-status 494b can be 0, so the error-index 494c can also be 0.

The variable-bindings 494d can be a list of 4 items 495a-495d, and items 495a-495d can include an OID 496a-496d and an object value 497a-497d. The response shown in FIG. 4H can include 4 items because the max-repetitions 484c as shown with respect to FIG. 4G was set to 4. In the example of FIG. 4H, the response items 495a-495d can include OIDs 496a-496d that start with 1.3.6.1.2.1.2.2.1.2, which can be the ifDescr object as previously described with respect to FIG. 4G. The ifDescr object can be indexed by the interface, so the OIDs 496a-496d ending with .1, .2, .3, and .4 can represent objects for the first four interfaces, and the values 497a-497d for the descriptions of those interfaces can be "Software Loopback Interface 1" for the first interface 497a, "Microsoft Kernel Debug Network Adapter" for the second interface 497b, "Realtek PCIe GBE Family Controller" for the third interface 497c, and "Qualcomm AR9845 Wireless Network Adapter" for the fourth interface 497d.

The specific formats and values used in the embodiments shown in FIGS. 4A-H use the Simple Network Management Protocol (SNMP). It should be understood that this is just one embodiment, and the present disclosure is not limited to use with SNMP.

FIG. 5 is an illustrative example of an example embodiment of a user interface for displaying and updating a discovery rule. The interface can include a label 501 indicating the purpose of the interface. The interface can include a field 502 for displaying and updating the name of the discovery rule. The interface can include a field 503 for displaying and selecting the type of the discovery rule from a set of options. Note that the configuration of the interface may change depending on the selection in field 503. In the embodiment shown, the field 503 selects a "Regular expression" type for the discovery rule. The interface can include a field 505 for displaying and updating the first pattern for the discovery rule. The field 505 can include an associated browsing button 504 that may bring up a separate interface to browse the available OIDs that may serve as a starting point for defining the first pattern in field 505. The interface can include a field 506 for displaying and updating the second pattern for the discovery rule. The interface can include a button 507 to accept changes made in the interface and update the discovery rule with the changes. The interface can include a button 508 to discard changes made in the interface and leave the discovery rule unchanged.

FIG. 6A is an illustrative table representing an example embodiment of a hierarchy of object identifiers for an indexed table of objects. The embodiment in FIG. 6A uses the IANA OID representation, but it should be understood that this is not a requirement, and hierarchies of object identifiers with indexed tables of objects can be represented by other object identifier representations. In the case of FIG. 6A, OID 601 can be 1.3.6.1.2.1.2, which can be the interfaces group as previously described with respect to FIG. 4D. Two of the OIDs one level down in the hierarchy can be 602a 1.3.6.1.2.1.2.1, which can address the ifNumber object, and 602b 1.3.6.1.2.1.2.2, which can address the ifTable object. The ifTable object 602b can include multiple entries, An entry can be an object addressed by the OID 603 1.3.6.1.2.1.2.2.1, which can address the ifEntry object. An ifEntry object 603 can include multiple objects one level down in the hierarchy, including the ifIndex object 604a, the ifDescr object 604b, the ifType object 604c, the ifMtu object 604d, the ifSpeed object 605e, and others as indicated by the ellipsis 605. For the objects 604a-604e in the ifEntry object, the OID can be made up of 1.3.6.1.2.1.2.2.1, followed by a number that can indicate the object, followed by an index (not shown in FIG. 6A) that can describe which interface the data applies to.

FIG. 6B is an illustrative example of an example embodiment of a user interface for displaying and updating a collection rule. The interface can include a label 611 indicating the purpose of the interface. The interface can include a field 612a for displaying and updating the name of the collection rule. The interface can include a field 612b for displaying and selecting the type of the collection rule from a set of options. Note that the configuration of the interface may change depending on the selection in field 612b. In the embodiment shown, the field 612b selects a "Custom Table Walk" type for the collection rule. The interface can include a field 612c for displaying and selecting the collection interval of the collection rule (how often the collection rule is applied) from a set of options. The interface can include a field 612d for displaying and selecting the historical interval of the collection rule (how long the data from the collection is saved before being discarded) from a set of options. The interface can include a field 612e for displaying and updating the third pattern associated with the collection rule. The interface can include a button 613 to accept changes made in the interface and update the discovery rule with the changes. The interface can include a button 614 to discard changes made in the interface and leave the discovery rule unchanged.

The third pattern in field 612e can be used to select the OIDs to which the collection rule can apply. In the example of FIG. 6B, the third pattern is the regular expression:

^1\.3\.6\.1\.2\.1\.2\.2\.1\.(?<Desc>2)|(?<Spd>5)\.(?<Idx>[0-9]*)$

The ^ and $ characters indicate that the third pattern matches the entire string of the OID, not just a subset. The \. characters in the third pattern are quoted periods, indicating that this part of the pattern can match a literal period in the string. The numbers, including the number 2 in (?<Desc>2) and the number 5 in (?<Spd>5), in the third pattern are actual characters that can match the same characters in the string. The [0-9]* in the third pattern can match zero or more digits in the string. So, this third pattern matches either 1.3.6.1.2.1.2.2.1.2.n or 1.3.6.1.2.1.2.2.1.5.n, where n is a number. In the IANA OID representation, this third pattern matches the ifDescr and ifSpeed OIDs for an interface, and n is the interface index.

The notation (?<name>pattern) has a special meaning in a regular expression; this notation can be called a named group, and the notation can mean that the text matched by pattern is captured in the group named name. The third pattern specified in the collection rule of FIG. 6B can use this notation to indicate that the index value (the last number) should be stored into a database column named "Idx", the object values returned from the device for OID 1.3.6.1.2.1.2.2.1.2.n should be stored into a database column "Desc", and the object values returned from the device for OID 1.3.6.1.2.1.2.2.1.5.n should be stored into a database column "Desc". This storage into a database column is more fully described with respect to FIG. 6C.

FIG. 6C is an illustrative table representing an example embodiment of a database table including an indexed table of information about a device. The table illustrates labels 622 with the column names used for the database columns 621a-621d, and the rows 623a-623d of data. The DevID column 621a can be an internal database identifier associated with a particular device that can be used to cross-reference the device with other areas of the database. The Idx column 621b can be filled in from the last number in a matching OID as described with respect to FIG. 6B. The Desc column 621c can be filled in with the data from the device object with OID 1.3.6.1.2.1.2.2.1.2.n as described with respect to FIG. 6B. The Spd column 621d can be filled in with the data from the device object with OID 1.3.6.1.2.1.2.2.1.5.n as described with respect to FIG. 6B.

The example rows 623a-623d can correspond to the response shown with respect to FIG. 4H. The Idx column values 621b can correspond to the last number in the OIDs 496a-496d in FIG. 4H. The Desc column values 621c can correspond to the values 497a-497d retrieved from the ifDesc objects as described with respect to FIG. 4H. Similarly, the Spd column values 621d may correspond to object values returned from the device (not illustrated in FIG. 4H). The DevID column values 621a can indicate that this information refers to the same device.

FIG. 7 is an illustrative example of an example embodiment of a user interface for displaying and updating a collection group. The interface can include a label 701 indicating the purpose of the interface. The interface can include a field 702a for displaying and updating the name of the collection group. The interface can include a field 702b for displaying and updating the name of the database table that the collection group can use for storing data. The interface can include a table 703 for displaying and updating the rules that are included in the collection group. The table 703 can include rows 705a-705d indicating which collection rules are included in the collection group. The table 703 can include descriptive column headers 704 that indicate the meaning of the columns 706a-706d in the table 703. Column 706a can display and update whether the rule in a row 705a-705d is included in the collection group. Column 706b can display the name of the rule in a row 705a-705d. Column 706c can display the type of the rule in a row 705a-705d. Column 706d can display the collection interval (how often the collection is applied) of the rule in a row 705a-705d. The interface can include a button 707c that can bring up a separate interface to add a collection rule to the collection group, and thereby can make the collection rule appear in the table 703. The interface can include a button 707a to accept changes made in the interface and update the collection group with the changes. The interface can include a button 707b to discard changes made in the interface and leave the collection group unchanged.

Figure 8:
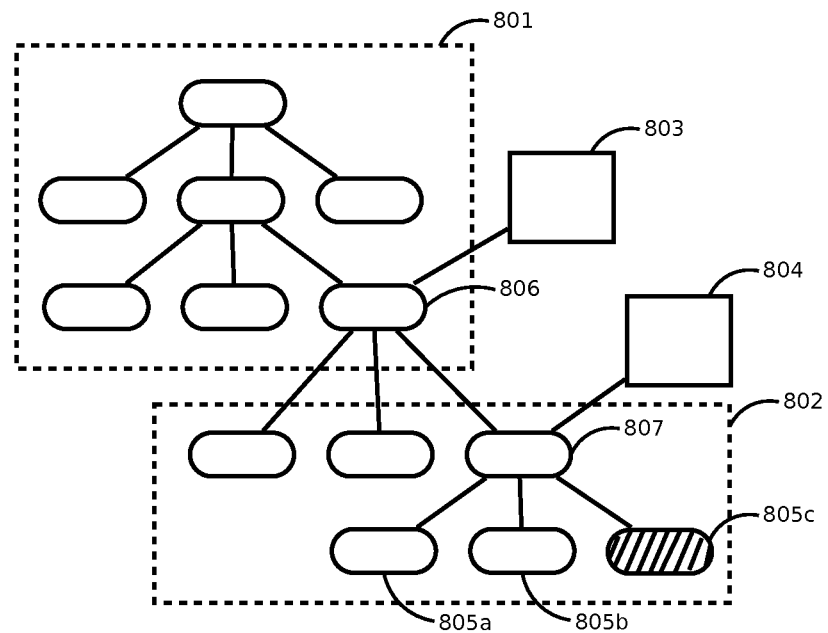
FIG. 8 is an illustrative block diagram of an example embodiment of an application of collection groups at multiple levels in a hierarchy of object identifiers.

FIG. 8 is an illustrative block diagram of an example embodiment of an application of collection groups at multiple levels in a hierarchy of object identifiers. The hierarchy of nodes represented by 801 and 802 can be a hierarchy of OIDs, such as the one shown with respect to FIG. 3. Blocks 803 and 804 can be collection groups as described with respect to FIG. 7. The collection group 803 can be associated with the OID 806, and may therefore apply to the objects referenced by OID 806 as well as the OIDs in the subtree 802. The collection group 804 can be associated with the OID 807, and may therefore apply to the objects referenced by OID 807 as well as the OIDs 805a, 805b, and 805c. As a result, the object referenced by OID 805c can have the collection rules in both collection group 803 and collection group 804 applied to the object.

Continuing the previous example of a stacked switch with duplicated OID subtrees under 1.3.6.1.4.1.99999.2 for the cores, the collection group 803 may include a collection rule such as:

\.2\.2\.1\.(?<Desc>2)|(?<Spd>5)\.(?<Idx>[0-9]*)$ which may allow the collection of network interface information from ifDescr and ifSpeed objects anywhere within the OID tree below the base, since the regular expression does not begin with a "^" and can therefore match levels further down in the subtree. The OID represented by 806 may be 1.3.6.1, and the OID represented by 807 may be 1.3.6.1.4.1.99999 so that the collection rule in the collection group 803 may be used to collect interface names and bandwidth for either interfaces using the standard OID structure under 806, or interfaces of the cores in the stacked switch using the private OID structure under 807. The OIDs for the interfaces of the cores may be in the OID tree 805c.

Continuing the same example further, the private OID subtree of the stacked switch may define 1.3.6.1.4.1.99999.3 to be a string describing the firmware version of the switch. The collection group 804 may include a collection rule such as:

^\.(?<FirmVers>3)$ to collect this firmware version. It may not be desirable to apply this collection rule arbitrarily in the OID tree, since this collection rule could match many different standard OIDs, but applying this collection rule at 807 may work correctly to collect the firmware version in the OID subtree 805c. In this example, as described, both of the collection groups 803 and 804 can be used to collect information in the OID subtree 805c.

In some embodiments, the OID tree 801 in FIG. 8 can include components or functionality of the hierarchical tree 110 as described with respect to FIG. 1. In some embodiments, the subtree 802 in FIG. 8 can include components or functionality of the subtree 115 as described with respect to FIG. 1.

Figure 9:
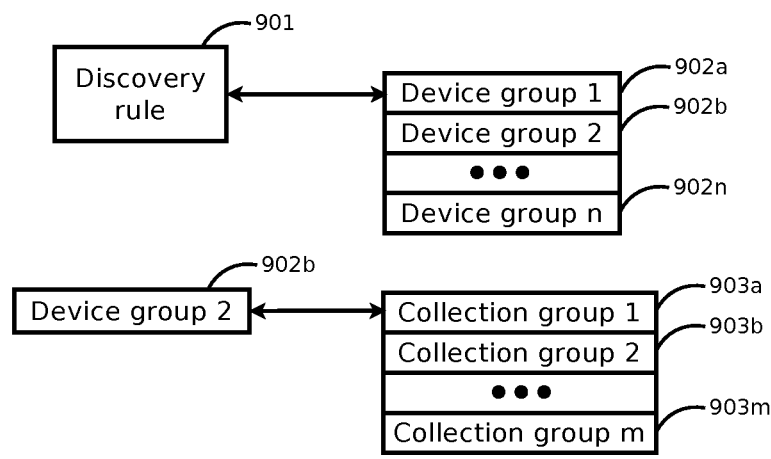
FIG. 9 is an illustrative block diagram of an example embodiment of selecting collection groups based on a discovery rule.

FIG. 9 is an illustrative block diagram of an example embodiment of selecting collection groups based on a discovery rule. The discovery rule 901 can be associated with a set of device groups 902a-902n. The device groups can be associated with different sets of collection groups. For example, device group 902b may be associated with collection groups 903a-903m. As a result, devices that are discovered using discovery rule 901 may have the collection groups 903a-903m applied to those devices, and the OIDs in those devices that are affected may be determined by the hierarchical process described with respect to FIG. 8.

Continuing the previous example of a discovery rule that discovers HEWLETT PACKARD LASERJET printers, the discovery rule 901 may use a first pattern of:

^1\.3\.6\.1\.2\.1\.[1|43]$ and a second pattern of:

^HP.*[Jj]et to discover HEWLETT PACKARD LASERJET printers. These devices may be in a device group 902a that can represent HEWLETT PACKARD devices, a device group 902b that can represent HEWLETT PACKARD printers, a device group 903c that can represent printers regardless of manufacturer, and so on. HEWLETT PACKARD printers may support OIDs for network interface ifDesc and ifSpeed entries, so the device group 902b can be associated with a collection group 903a that can include a collection rule such as:

^1\.3\.6\.1\.2\.1\.2\.2\.1\.(?<Desc>2)|(?<Spd>5)\.(?<Idx>[0-9]*)$ to collect information about the name and bandwidth of the network interfaces on the printer. The device group 902b may also be associated with other collection groups 903b and so on to collect other data supported by HEWLETT PACKARD printers.

Figure 10:
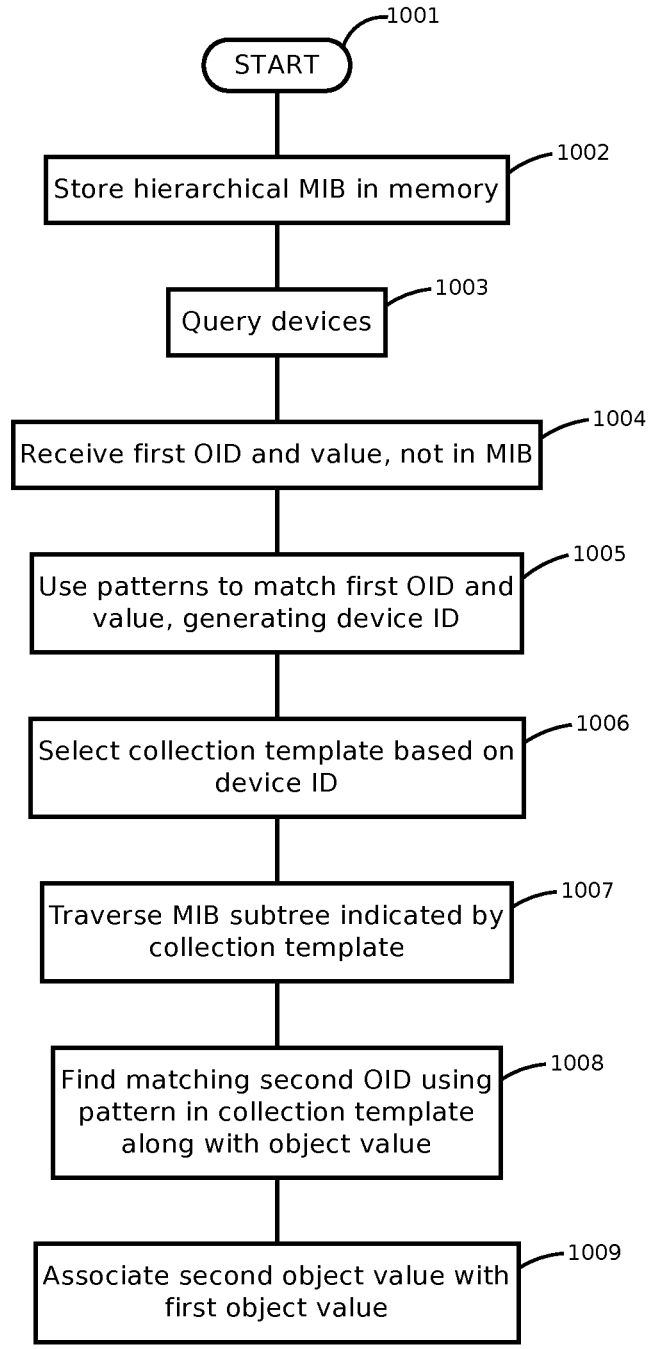
FIG. 10 is an illustrative flowchart depicting an example embodiment of a method of discovering and monitoring devices using search patterns for object identifiers and values.

FIG. 10 is an illustrative flowchart depicting an example embodiment of a method of discovering and monitoring devices using search patterns for object identifiers and values. The method 1001 can include storing, in a memory element of a server comprising one or more processors, in a first data structure, a management information base (MIB) having a hierarchical tree comprising a plurality of object identifiers and a plurality of corresponding object values (1002). The MIB can be a collection of object identifiers (OIDs) with associated object values. The OIDs can be used to read object values in order to get information from a device, and can be used to write object values in order to update settings on a device. The OIDs can follow the X.690 standard, and may be read and written using Simple Network Management Protocol (SNMP). The OIDs can be represented in numeric form, such as 1.3.6.1, or in symbolic form, such as iso.identified-organizations.dod.internet, where these two examples follow the X.690 standard. The MIBs can reference OIDs that are standardized, or customized to a particular vendor or hardware, or both. The MIBs can be stored in a standard format that may be intended to simplify inter-operation between multiple applications and implementations. The object values may be represented as strings, numbers, counters, auto-reset counters, tables of object values, or other data types.

The method 1001 can include querying, by a detection module executing on the one or more processors of the server, one or more devices (1003). The detection module can query the devices using Telnet, Hypertext Transfer Protocol (HTTP), HTTP over Secure Sockets Layer (SSL) (HTTPS), SNMP, Universal Plug and Play (UPnP), or other protocols. The query may be implemented using a point-to-point connection, a broadcast transmission, a multicast transmission, or other connection mechanisms. The query may be done on a polled basis, using a timer, or on an event driven basis, in response to an indication from a device, or as a result of an indication from a user interface, or in response to another mechanism. The query may be on a single OID, such as an SNMP GET request, or it may be on a group of OIDs, such as an SNMP GETBULK request. A series of individual queries may be made on a range of OIDs, such as a series of SNMP GETNEXT requests.

The method 1001 can include receiving, responsive to a query, a first object identifier and a corresponding first object value from a device, the first object identifier varying from the plurality of object identifiers of the MIB, and the first object value varying from the plurality of corresponding object values of the MIB (1004). For example, the device could be a CISCO 888 ROUTER, but the MIB could be for the CISCO 881 ROUTER, so the OIDs and object values indicating the system name may not match between the device and the MIB, even though the device is largely similar to the device described by the MIB. In some circumstances, the OIDs could match between the device and the MIB, but not the object values. In other cases, the object values could match between the device and the MIB, but not the OIDs. In still other cases, neither the OIDs nor the object values may match between the device and the MIB.

The method 1001 can include generating, by the detection module, using a first pattern that matches the first object identifier and a second pattern that matches the first object value, an identification of the device (1005). For example, all of the CISCO 800 SERIES ROUTERS may use similar system names, and the system name for the devices may be stored with a few different OIDs. In a case like this, the first pattern can match any OID that is used for the system name for a CISCO 800 SERIES ROUTER, and the second pattern can match all the object values that are used for system names for CISCO 800 SERIES ROUTERS. These two patterns can then be used to detect any CISCO 800 SERIES ROUTER even if the MIBs for these devices are not available.

The method 1001 can include selecting, by a collection module executing on the server, a collection template from a plurality of collection templates based on the identification of the device, the collection template indicating a subtree of the MIB and comprising a collection pattern (1006). A collection template can be associated with a device or any group of devices, so a collection template may be associated with a CISCO 888 ROUTER, and another collection template may be associated with any CISCO 800 SERIES ROUTER. In this example, both of these templates may be associated with a CISCO 888 ROUTER, so it is possible to have two collection templates selected for a single device. A collection template can include a collection pattern that may be used to collect information from a device, and can also indicate the root of a subtree in the MIB where the collection pattern should be applied. This indication of the root can be valuable even if the MIB is not available, because the OID can be scanned hierarchically directly on the device, for example, by using a SNMP GETBULK request, or by starting at the root OID and using a series of SNMP GETNEXT requests.

The method 1001 can include traversing, by the collection module, the subtree using the collection template (1007). If the MIB is available for the device, the MIB can be scanned locally for matches against the collection pattern, and only matching OIDs can be used to generate queries to the device. If the MIB is not available, then the device itself can be scanned starting at the root OID to traverse the subtree. For example, an SNMP GETBULK request or a series of SNMP GETNEXT requests can be used to scan the device in this way. The collection pattern can be applied to the OIDs and object values retrieved from either the device or the MIB to check for matches.

The method 1001 can include identifying a second object identifier that matches the collection pattern and a corresponding second object value, the second object identifier varying from the plurality of object identifiers of the MIB (1008). During the traversal of the OID tree, either in the MIB or using results directly from the device, a match may be found between the collection pattern and a second OID. This can select the OID and also select the second object value, which is associated with this second OID.

The method 1001 can include associating, by the collection module, in a second data structure in the memory, the second object value with the first object value based on the collection template (1009). For example, the collection module may use information from the first object value as an index column in a row in a database table, and use the second object value as information in the same row, and in this way, build up information about devices in a database table that can be queried to generate a summary display about the devices. The collection pattern itself can include directions on how to store the first and second object values. For example, as described previously, if the collection pattern is a regular expression, it may include a named group, which may indicate the name of a database column where the matching data in the named group in the pattern can be stored.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures may be performed in any order. In certain embodiments, multitasking and parallel processing may be advantageous.

While this specification contains many specific implementation details, these should not be construed as limitations on the scope of any subject matter of what may be claimed, but rather as descriptions of features specific to particular implementations of the subject matter. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A system for managing remote devices, comprising:
   a server comprising one or more processors;
   at least one memory element storing, in a first data structure, a management information base (MIB) having a hierarchical tree comprising a plurality of object identifiers and a plurality of corresponding object values;
   a detection module executing on the one or more processors of the server that queries one or more devices using a networking protocol and receives, responsive to a query and from a device, a first object identifier and a first object value that corresponds to the first object identifier, the first object identifier varies from each of the plurality of object identifiers of the MIB due to a first error, and the first object value varies from each of the plurality of corresponding object values of the MIB due to a second error;
   the detection module generates, using a first pattern that matches the first object identifier and a second pattern that matches the first object value, an identification of the device;
   a collection module executing on the server that selects a collection template from a plurality of collection templates based on the identification of the device, the collection template indicating a subtree of the MIB and comprising a collection pattern configured to account for at least one of the first error that caused the first object identifier to vary from each of the plurality of object identifiers of the MIB or the second error that caused the first object value to vary from each of the plurality of corresponding object values of the MIB;

the collection module traverses the subtree using the collection template configured to account for the at least one of the first error or the second error to identify a second object identifier that matches the collection pattern and a second object value corresponding to the second object identifier, the second object identifier varies from the plurality of object identifiers of the MIB; and the collection module associates, in a second data structure in the at least one memory element, the second object value with the first object value based on the collection template.

2. The system of claim 1, wherein at least one of the first pattern, the second pattern or the collection pattern is based on a regular expression.

3. The system of claim 1, wherein the collection module further:

traverses the subtree using the collection template to identify each object identifier that matches the collection pattern, and associates each corresponding object value with the first object value and the second object value in the second data structure in the at least one memory element.

4. The system of claim 1, further comprising:

a collection group indicating a starting point within the hierarchical tree of the MIB and comprising the first pattern, the second pattern, and the collection template;

the detection module generates, scanning from the starting point, using the first pattern that matches the first object identifier and the second pattern that matches the first object value, the identification of the device; and the collection module traverses the subtree, scanning from the starting point, using the collection template to identify the second object identifier.

5. The system of claim 1, wherein at least one of the first object identifier or the second object identifier is based on an X.690 object identifier.

6. The system of claim 1, wherein at least one of the first object identifier or the second object identifier is represented by at least one of a numeric representation or a symbolic representation.

7. The system of claim 1, wherein the collection pattern is based on a regular expression comprising a named group that indicates a relationship between the second object value and the first object value.

8. The system of claim 1, wherein the detection module generates the query using a Simple Network Management Protocol.

9. The system of claim 1, wherein the device of the one or more devices is a first device, and the system further comprises:

a second device of the one or more devices, wherein the second device is provided by a same manufacturer of the first device;

the detection module further queries the second device to obtain a third object identifier from the second device and a third object value corresponding to the third object identifier; and the collection module associates, in the second data structure, the third object value with the first object value and the second object value based on the collection template.

10. The system of claim 9, wherein at least one of the third object identifier varies from the plurality of object identifiers of the MIB, or the first object value varies from the plurality of corresponding object values of the MIB.

11. A method for managing remote devices, comprising:

storing, in at least one memory element of a server comprising one or more processors, in a first data structure, a management information base (MIB) having a hierarchical tree comprising a plurality of object identifiers and a plurality of corresponding object values;

querying, by a detection module executing on the one or more processors of the server, one or more devices;

receiving, responsive to a query and from a device, a first object identifier and a first object value that corresponds to the first object identifier, the first object identifier varying from each of the plurality of object identifiers of the MIB due to a first error, and the first object value varying from each of the plurality of corresponding object values of the MIB due to a second error;

generating, by the detection module, using a first pattern that matches the first object identifier and a second pattern that matches the first object value, an identification of the device;

selecting, by a collection module executing on the server, a collection template from a plurality of collection templates based on the identification of the device, the collection template indicating a subtree of the MIB and comprising a collection pattern configured to account for at least one of the first error that caused the first object identifier to vary from each of the plurality of object identifiers of the MIB or the second error that caused the first object value to vary from each of the plurality of corresponding object values of the MIB;

traversing, by the collection module, the subtree using the collection template configured to account for the at least one of the first error or the second error to identify a second object identifier that matches the collection pattern and a second object value that corresponds to the second object identifier, the second object identifier varies from the plurality of object identifiers of the MIB; and associating, by the collection module, in a second data structure in the at least one memory element, the second object value with the first object value based on the collection template.

12. The method of claim 11, wherein at least one of the first pattern, the second pattern or the collection pattern is based on a regular expression.

13. The method of claim 11, further comprising:

traversing, by the collection module, the subtree using the collection template to identify each object identifier that matches the collection pattern, and associating each corresponding object value with the first object value and the second object value in the second data structure in the at least one memory element.

14. The method of claim 11, further comprising:

generating, by the detection module, scanning from a starting point within the hierarchical tree of the MIB, using the first pattern that matches the first object identifier and the second pattern that matches the first object value, the identification of the device; and traversing, by the collection module, the subtree, scanning from the starting point, using the collection template to identify the second object identifier;

wherein a collection group indicates the starting point and comprises the first pattern, the second pattern, and the collection template.

15. The method of claim 11, wherein at least one of the first object identifier or the second object identifier is based on an X.690 object identifier.

16. The method of claim 11, wherein at least one of the first object identifier or the second object identifier is represented by at least one of a numeric representation or a symbolic representation.

17. The method of claim 11, wherein the collection pattern is based on a regular expression comprising a named group that indicates a relationship between the second object value and the first object value.

18. The method of claim 11, further comprising:
querying, by the detection module, the one or more devices using a Simple Network Management Protocol.

19. The method of claim 11, wherein the device of the one or more devices is a first device, and the method further comprises:
querying, by the detection module a second device of the one or more devices to obtain a third object identifier from the second device and a third object value corresponding to the third object identifier, the second device provided by a same manufacturer of the device; and
associating, by the collection module, in the second data structure, the third object value with the first object value and the second object value based on the collection template.

20. The method of claim 19, wherein at least one of the third object identifier varies from the plurality of object identifiers of the MIB, or the first object value varies from the plurality of corresponding object values of the MIB.

* * * * *